United States Patent
Wakamatsu et al.

(10) Patent No.: US 12,335,624 B2
(45) Date of Patent: Jun. 17, 2025

(54) IMAGE PICKUP APPARATUS THAT PERFORMS AUTOMATIC SHOOTING, CONTROL METHOD THEREFOR, AND STORAGE MEDIUM

(71) Applicant: CANON KABUSHIKI KAISHA, Tokyo (JP)

(72) Inventors: Nobushige Wakamatsu, Tokyo (JP); Katsuhiro Ito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 109 days.

(21) Appl. No.: 18/168,606

(22) Filed: Feb. 14, 2023

(65) Prior Publication Data
US 2023/0269479 A1    Aug. 24, 2023

(30) Foreign Application Priority Data

Feb. 24, 2022 (JP) .................. 2022-026897
Mar. 8, 2022 (JP) .................. 2022-035497
Jun. 27, 2022 (JP) .................. 2022-102881

(51) Int. Cl.
*H04N 23/695* (2023.01)
*G06T 7/20* (2017.01)
*H04N 23/69* (2023.01)

(52) U.S. Cl.
CPC .......... *H04N 23/695* (2023.01); *G06T 7/20* (2013.01); *H04N 23/69* (2023.01); *G06T 2207/30201* (2013.01)

(58) Field of Classification Search
CPC .... H04N 23/695; H04N 23/69; H04N 23/667; H04N 23/6811; H04N 23/6812; H04N 23/6815; H04N 23/611; G06T 7/20; G06T 2207/30201; G06T 2207/30196; G06T 7/215; G06T 7/223

See application file for complete search history.

(56) References Cited

U.S. PATENT DOCUMENTS

| | | | |
|---|---|---|---|
| 11,102,389 B2 | 8/2021 | Wakamatsu | |
| 2010/0245532 A1* | 9/2010 | Kurtz | G06V 20/40 348/14.03 |
| 2020/0228692 A1 | 7/2020 | Wakamatsu | |
| 2021/0337100 A1 | 10/2021 | Wakamatsu | |

FOREIGN PATENT DOCUMENTS

JP    2019-106694 A    6/2019

OTHER PUBLICATIONS

Laurent Itti, et al., "A Model of Saliency-Based Visual Attention for Rapid Scene Analysis," IEEE Transactions on Pattern Analysis and Machine Intelligence, vol. 20, No. 11, Nov. 1998, pp. 1254-1259.

* cited by examiner

*Primary Examiner* — Yogesh K Aggarwal
(74) *Attorney, Agent, or Firm* — Venable LLP

(57) ABSTRACT

An image pickup apparatus capable of performing automatic shooting suitable for a subject moving a lot. The apparatus includes an image pickup portion configured to output an image of a subject formed by an image pickup optical system, and a drive portion configured to rotate the image pickup portion about an axis. In the apparatus, one or more controllers detects a specific subject in the image, detects motion vectors in the image, and detects a moving subject in the image based on the vectors, wherein the specific or moving subject is determined as a subject to be shot, and based on motion information on the that subject, adjusting composition and tracking of that subject is performed.

31 Claims, 21 Drawing Sheets

*FIG. 11*

| MOTION TRACKING EFFECT | NONE | | | MEDIUM | | HIGH |

IMAGE PICKUP APPARATUS THAT PERFORMS AUTOMATIC SHOOTING, CONTROL METHOD THEREFOR, AND STORAGE MEDIUM

BACKGROUND OF THE INVENTION

Field of the Invention

The present invention relates to an image pickup apparatus that performs automatic shooting, a control method therefor, and a storage medium.

Description of the Related Art

In an image pickup apparatus such as a digital camera, important operations in shooting such as determination of exposure and focusing have been automated. A control apparatus that rotates a camera in pan and tilt directions in order to, for example, search for a subject has also been proposed. Some of conventionally proposed control apparatuses perform focusing control, exposure control, and subject tracking by panning/tilting, according to information on a person detected by a detecting function of detecting the face and body of a person included in a subject. Japanese Laid-Open Patent Publication (Kokai) No. 2019-106694 discloses automatic subject search, an automatic tracking apparatus, and an apparatus that performs automatic shooting.

The prior art disclosed in Japanese Laid-Open Patent Publication (Kokai) No. 2019-106694, however, has the following problems. For example, in a case where a subject in a sport scene or the like is moving a lot, a lively image is required to be obtained even if the face of the subject is not clear. However, it is difficult to detect the subject because the subject is moving a lot. Moreover, even if a subject can be detected, it is difficult to obtain a lively image based on only information on the detected subject.

SUMMARY OF THE INVENTION

The present invention provides an image pickup apparatus that is capable of performing automatic shooting suitable for a subject moving a lot, a control method therefor, and a storage medium.

Accordingly, the present invention provides an image pickup apparatus comprising an image pickup portion configured to output an image of a subject formed by an image pickup optical system, a drive portion configured to rotate the image pickup portion about an axis, at least one memory that stores a set of instructions, and one or more controllers configured to function as: a subject detecting unit configured to detect a specific subject in the image; a motion vector detecting unit configured to detect motion vectors in the image; and a moving subject detecting unit configured to, based on the detected motion vectors, detect a moving subject in the image, wherein the specific subject or the moving subject is determined as a subject to be shot which is a target of shooting, and based on motion information on the subject to be shot, the drive portion is controlled to adjust composition for the image pickup portion and control tracking of the subject to be shot.

According to the present invention, automatic shooting suitable for a subject moving a lot can be performed.

Further features of the present invention will become apparent from the following description of exemplary embodiments with reference to the attached drawings.

BRIEF DESCRIPTION OF THE DRAWINGS

FIG. 11 is a view useful in explaining a display screen of the external apparatus for the user to make a setting according to the third embodiment.

DESCRIPTION OF THE EMBODIMENTS

The present invention will now be described in detail below with reference to the accompanying drawings showing embodiments thereof. However, configurations in the embodiments described below are only examples, and the scope of the present invention is not limited to the configurations in the embodiments described below.

First Embodiment

<Configuration of Image Pickup Apparatus>

Figure 1A:
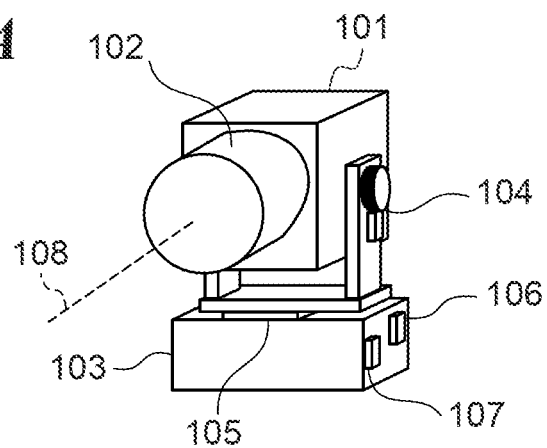
FIGS. 1A to 1D are schematic views useful in explaining an appearance of an image pickup apparatus according to embodiments of the present invention.

FIGS. 1A to 1D are schematic views useful in explaining an appearance of an image pickup apparatus 101 according to embodiments of the present invention. The image pickup apparatus 101 in FIG. 1A is equipped with a power switch (not shown). A lens barrel 102 equipped with an image pickup optical system (including a taking lens group, a diaphragm, etc.) is provided in the image pickup apparatus 101. Although in the following descriptions, it is assumed that the lens barrel 102 is fastened to the image pickup apparatus 101, the lens barrel 102 may be configured to be interchangeable. The image pickup apparatus 101 has such a mechanism as to be rotationally driven with respect to a fixing unit 103. A tilt rotation unit 104 is equipped with a motor drive mechanism that rotates the image pickup apparatus 101 in a pitch direction (refer to FIG. 1B). A pan rotation unit 105 has a motor drive mechanism that rotates the image pickup apparatus 101 in a yaw direction (refer to FIG. 1B).

Figure 1B:
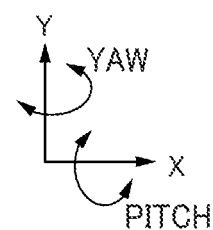

The tilt rotation unit 104 and the pan rotation unit 105 constitute a pan-tilt rotation unit that has a mechanism for panning and tilting the image pickup apparatus 101. In FIG. 1B, "Pitch" and "Yaw" represent rotations about the x-axis and the y-axis, respectively, and the x-axis and the y-axis are axes defined at fixed positions of the fixing unit 103.

The fixing unit 103 is equipped with an angular velocity sensor 106 and an acceleration senor 107. Vibrations of the image pickup apparatus 101 can be detected based on outputs from the angular velocity sensor 106 and the acceleration senor 107. The tilt rotation unit 104 and the pan rotation unit 105 are rotationally driven based on detected vibration angles. This corrects for vibration and tilt of the image pickup apparatus 101.

Figure 1C:
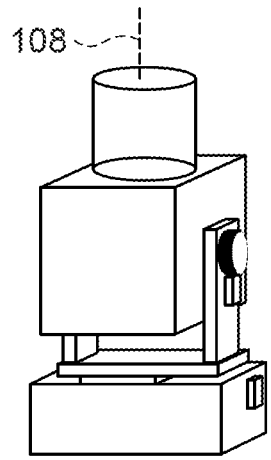
Figure 1D:
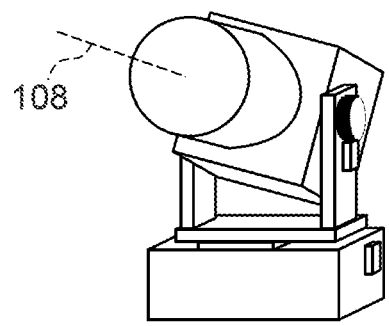

A reference numeral 108 designates the direction of an optical axis. FIG. 1C shows a state in which the image pickup apparatus 101 has been tilted (rotated in tilt direction) 90 degrees from the state shown in FIG. 1A. FIG. 1D shows a state in which the image pickup apparatus 101 has been tilted (rotated in tilt direction) 0 degrees (0<θ<90) from the state shown in FIG. 1A.

Figure 2:
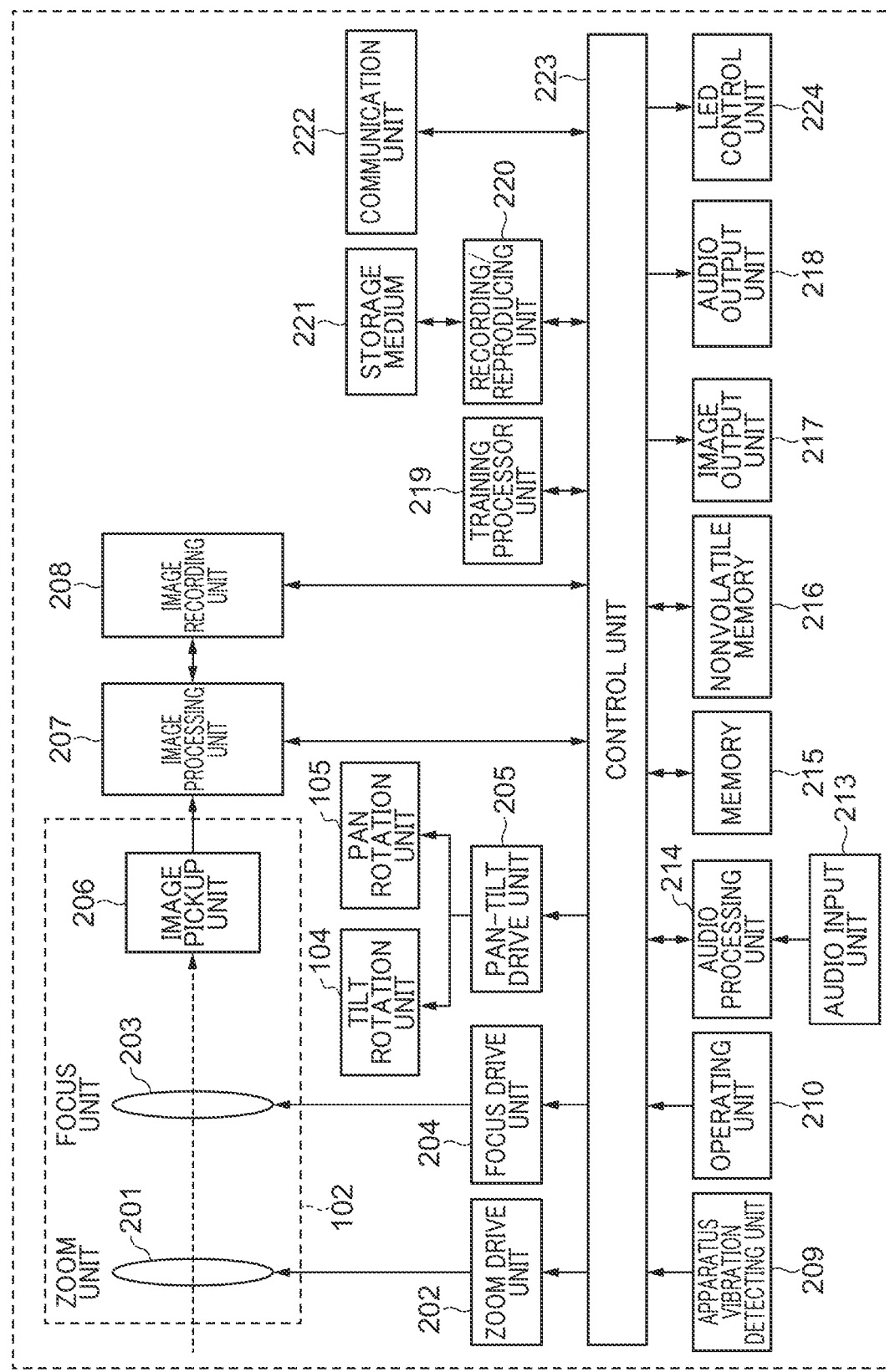
FIG. 2 is a functional configuration diagram of the image pickup apparatus according to the embodiments of the present invention.

FIG. 2 is a functional configuration diagram of the image pickup apparatus 101 according to the embodiments of the present invention. A control unit 223 is comprised of, for example, a CPU (or an MPU, a computer, etc.), a memory (e.g., DRAM, SRAM), a nonvolatile memory (EEPROM), and so forth. The control unit 223 executes programs to control the components of the image pickup apparatus 101, control data transfer between the components, and implement other various functions. A nonvolatile memory 216, which is an electrically erasable programmable memory, stores parameters, programs, and so forth required for operation of the control unit 223.

The lens barrel 102 includes a zoom unit 201, a focus unit 203, and an image pickup unit 206. The zoom unit 201 includes a zoom lens for zooming. A zoom drive unit 202 drivingly controls the zoom unit 201. Namely, the zoom drive unit 202 changes the focal length of the image pickup optical system. The focus unit 203 includes a lens that adjusts the focus. A focus drive unit 204 drivingly controls the focus unit 203. The image pickup unit 206 includes an image pickup device (not shown) on which an image of a subject is formed. The image pickup device of the image pickup unit 206 receives incident light via a lens group and outputs information on electric charge corresponding to the amount of the received light as analog image data (shot image) to an image processing unit 207.

The image processing unit 207 performs image processing such as distortion correction, white balance, and color interpolation on digital image data obtained through conversion of the analog image data, and outputs the processed digital image data. An image recording unit 208 converts the processed digital image data output from the image processing unit 207 into a recording format such as JPEG. The image data converted into the recording format is sent to a memory 215 and an image output unit 217.

A pan-tilt drive unit 205 is a rotational drive unit for driving the tilt rotation unit 104 and the pan rotation unit 105. Namely, the pan-tilt drive unit 205 rotationally drives the image pickup apparatus 101 equipped with the lens barrel 102 in the tilt direction and the pan direction. An apparatus vibration detecting unit 209 includes, for example, the angular velocity sensor (a gyro sensor) 106, which detects angular velocities in the directions of the three axes of the image pickup apparatus 101, and the acceleration sensor 107, which detects accelerations in the directions of the three axes of the image pickup apparatus 101. Based on detected signals, the rotational angle of the image pickup apparatus 101, the shift amount of the image pickup apparatus 101, and so forth are calculated.

An operating unit 210 receives various operations on the image pickup apparatus 101. The operating unit 210 is equipped with, for example, a power button, and a button for giving a trigger to the image pickup apparatus 101 to take a picture, and so forth. When the power button is operated, the power is supplied to the image pickup apparatus 101 to start the image pickup apparatus 101. An audio input unit 213 picks up audio around the image pickup apparatus 101 as an analog signal using a microphone provided in the image pickup apparatus 101, performs analog-to-digital conversion of the analog signal to obtain a digital audio signal, and sends the digital audio signal to an audio processing unit 214. The audio processing unit 214 subjects the received digital audio signal to audio-related processes such as an optimization process. The audio signal subjected to the various processes by the audio processing unit 214 is then sent to a memory 215 by the control unit 223. The memory 215 temporarily stores the image signal obtained by the image processing unit 207 and the audio signal obtained by the audio processing unit 214.

The image processing unit 207 reads out the image signal temporarily stored in the memory 215 and performs coding or the like of the image signal to generate a compressed image signal. The audio processing unit 214 reads out the audio signal temporarily stored in the memory 215 and performs coding or the like of the audio signal to generate a compressed audio signal. The control unit 223 sends the compressed image signal and the compressed audio signal to a recording/reproducing unit 220.

The recording/reproducing unit 220 records the compressed image signal and the compressed audio signal generated respectively by the image processing unit 207 and the audio processing unit 214, other control data related to shooting, and so forth into a storage medium 221. In a case where the audio signal is not subjected to compression coding, the control unit 223 sends the audio signal generated by the audio processing unit 214 and the compressed image signal generated by the image processing unit 207 to the recording/reproducing unit 220, and the recording/reproducing unit 220 records the received signals into the storage medium 221. In the following descriptions, a process in which image data output from the image pickup device is recorded in a memory will be referred to as a shooting process. The memory may be either the storage medium 221 or a memory provided in an external apparatus 301.

The storage medium 221 may be either a storage medium (e.g., an HD) incorporated in the apparatus 101 or a removable storage medium (e.g., a USB memory, a memory card). In general, a storage medium that is capable of recording various types of data such as a compressed image signal, a compressed audio signal, an audio signal, and so forth generated by the image pickup apparatus 101 and has a larger capacity than that of the nonvolatile memory 216 is used as the storage medium 221. Examples of the storage medium 221 include a hard disk, an optical disk, a magneto-optical disk, a CD-R, a DVD-R, a magnetic tape, a nonvolatile semiconductor memory, and a flash memory.

The recording/reproducing unit 220 has a function of reading out and reproducing a compressed image signal, a compressed audio signal, an audio signal, various types of data, and programs recorded in the storage medium 221. The compressed image signal and the compressed audio signal read out by the recording/reproducing unit 220 are sent to the image processing unit 207 and the audio processing unit 214 by the control unit 223. The image processing unit 207 temporarily stores the compressed image signal in the memory 215, decodes the stored compressed image signal using a predetermined procedure, and send a signal obtained by decoding to the image output unit 217. The audio processing unit 214 temporarily stores the compressed audio signal in the memory 215, decodes the stored compressed audio signal using a predetermined procedure, and send a signal obtained by decoding to the image output unit 217.

The audio output unit 218 has a speaker incorporated in the image pickup apparatus 101, and for example, when shooting is performed, outputs an audio pattern set in advance from the speaker. An LED control unit 224 has a plurality of LEDs, and for example, when shooting is performed, controls the plurality of LEDs to light up in a set lighting/blinking pattern. The image output unit 217, which is comprised of, for example, an image output terminal, outputs an image signal for displaying an image on for example, a connected external display. Note that the audio output unit 218 and the image output unit 217 may be provided as one coupled terminal. Namely, an HDMI (registered trademark) (High-Definition Multimedia Interface) terminal or the like may be adopted as the audio output unit 218 and the image output unit 217.

A communication unit 222 carries out communications between the image pickup apparatus 101 and the external apparatus 301. The communication unit 222 sends and receives data such as an audio signal, an image signal, a compressed audio signal, and a compressed image signal, between the image pickup apparatus 101 and the external apparatus 301. The communication unit 222 also has a function of sending information indicating an internal state of the image pickup apparatus 101 such as error information to the external apparatus 301 when the image pickup apparatus 101 has detected an abnormal state. The communication unit 222 is for example, an infrared communication module, a Bluetooth (registered trademark) communication module, a wireless LAN communication module, and a wireless communication module such as a wireless USB and a GPS receiver. A training processor unit 219 performs learning described below.

<Configuration in Relation to External Communication Apparatus>

Figure 3:
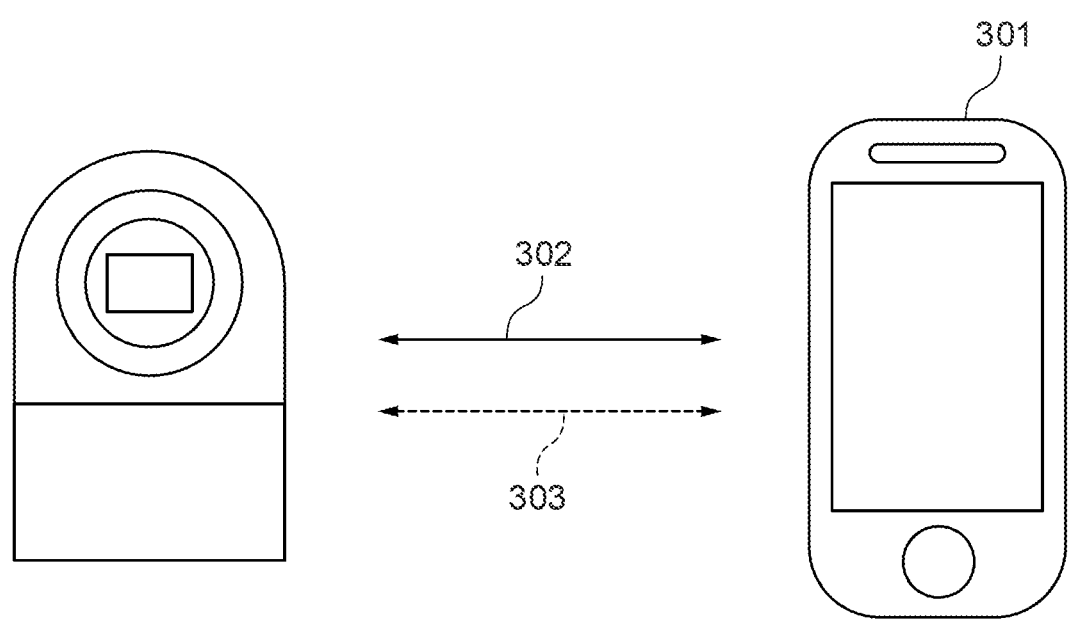
FIG. 3 is a schematic view useful in explaining communication between the image pickup apparatus according to the embodiments of the present invention and an external apparatus.

FIG. 3 is a schematic view useful in explaining communication between the image pickup apparatus 101 according to the embodiments of the present invention and the external apparatus 301. The image pickup apparatus 101 is an apparatus equipped with an image pickup function. The external apparatus 301 is a smart device including a Bluetooth (registered trademark) communication module and a wireless communication module. The external apparatus 301 is, for example, a smartphone. The image pickup apparatus 101 and the external apparatus 301 are capable of communicating with each other via communication (designated by a reference numeral 302) using a wireless LAN conforming to the IEEE 802.11 series and communication (designated by a reference numeral 303) having a master-slave relationship of, for example, a control station and a subordinate station, such as Bluetooth Low Energy (hereafter referred to as the BLE).

The wireless LAN and the BLE are examples of communication forms, and the image pickup apparatus 101 and the external apparatus 301 have a function of carrying out communications in a plurality of communication forms. For example, other communication methods may be adopted as long as one communication form can be controlled using the other communication form in which communication is carried out under a relationship between a control station and a subordinate station. However, without loss of generality, the first communication form (302) using the wireless LAN or the like is capable of higher-speed communication than the second communication form (303) using the BLE or the like. It is assumed that in the second communication form, at least the power consumption is lower or the communicable distance is shorter than in the first communication form.

<Shooing Mode Process>

Figure 4:
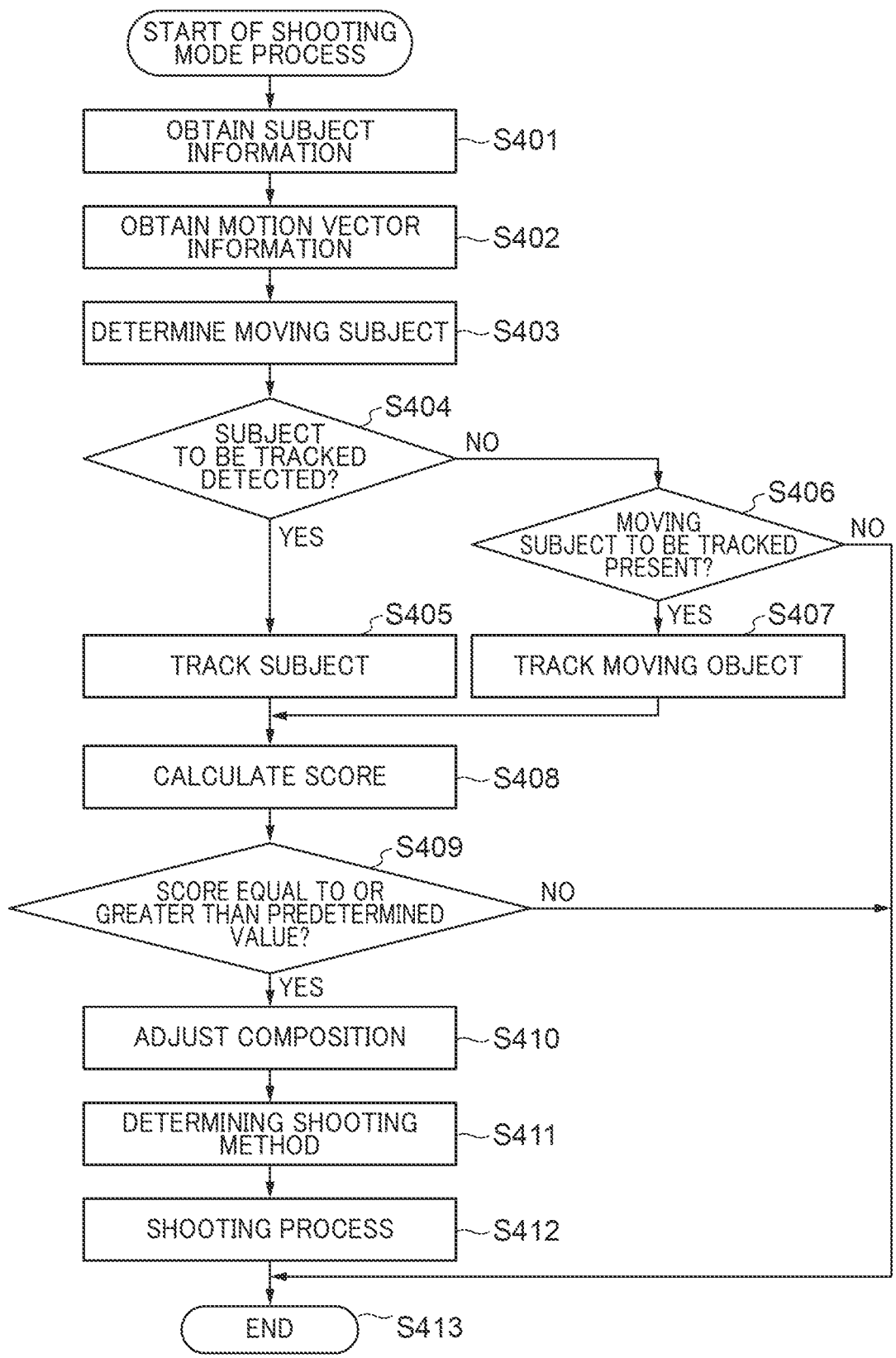
FIG. 4 is a flowchart showing a shooting mode process according to the first embodiment.

FIG. 4 is a flowchart showing a shooting mode process according to the first embodiment. The process in FIG. 4 is carried out mainly by the image processing unit 207 and the control unit 223. In S401, the image processing unit 207 performs image processing on an image pickup signal captured by the image pickup unit 206 to generate an image for subject detection. Subjects such as a person and an object are detected from the generated image. In a case where a person is to be detected, a face or a body (head, torso, whole body, etc.) of the subject is detected. A pattern for determining a person's face is set in advance, and in a face detection process, a part in a shot image which matches the set pattern is detected as a facial image of the person.

In S401, the image processing unit 207 also calculates the degree of reliability indicating the likelihood as a subject's face at the same time. The degree of reliability is calculated from, for example, the size of a face area in an image, the degree of coincidence with a facial pattern, and the like. The same holds for object recognition. A pattern for determining an object is set in advance, and by determining whether or not each part in a shot image matches the set pattern set in advance, the part can be recognized as an object. For example, animals such as dogs, cats, and birds, vehicles such as cars, two-wheel vehicles, airplanes, and trains, and so forth can be detected as objects. By calculating evaluation values for respective image areas of subjects recognized as persons (or objects), an image area of a subject with the greatest evaluation value can be determined to be a main subject area (specific subject).

In S402, the apparatus vibration detecting unit 209 captures a 3-axis angular velocity output from the angular velocity sensor 106 set on the fixing unit 103. The apparatus vibration detecting unit 209 also captures present pan/tilt angular positions from the output from encoders, which are provided in respective of the tilt rotation unit 104 and the pan rotation unit 105 and capable of obtaining rotational angles. The apparatus vibration detecting unit 209 also captures a motion vector calculated by the image pickup unit 206 and the image processing unit 207. To detect the motion vector, the image is divided into a plurality of areas, the present image is compared with the image one frame before the present image stored in advance (that is, two consecutive images are compared with each other), and the moving amount of the image (subject) is calculated from the relative displacement of the images. After the motion vector is captured (motion vector information is obtained), the process proceeds to S403.

<Method of Determining Moving Subject>

In S403, based on the information captured in S402, it is determined whether or not there is a moving subject detection area on the shot image (moving subject determination). A description will now be given of the moving subject determination in S403. First, whether or not there is any subject (distinctive subject) with distinctive characteristics is determined with respect to each of image frames from the image processing unit 207. In the present embodiment, the degree of distinctiveness means the degree of distinctiveness of characteristic, and the degree of distinctiveness is determined based on hue, chroma, and brightness.

The more distinct from the background, the higher the degree of distinctiveness. Note that the method for calculating the degree of distinctiveness is described in, for example, the following literature: "Laurent Itti, Christof Koch, and Ernst Niebur, "A Model of Saliency-Based Visual Attention for Rapid Scene Analysis", IEEE Transactions on Pattern Analysis and Machine Intelligence archive Volume 20 Issue 11, November 1998 Pages 1254-1259." The degree of distinctiveness can be calculated using the well-known method for calculating the degree of distinctiveness described in the above literature.

Figure 5:
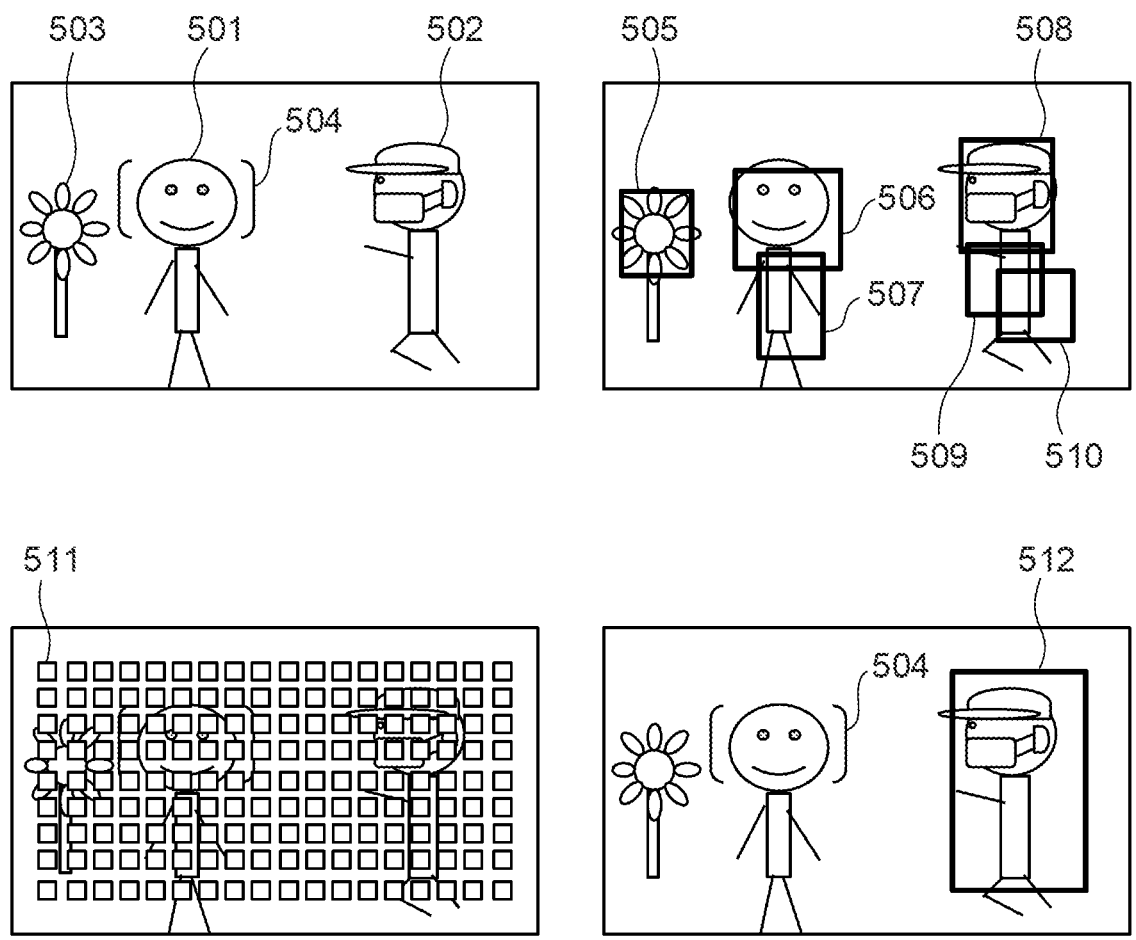
FIG. 5 is a view useful in explaining a moving subject detecting process according to the first embodiment.

In the present embodiment, whether or not a certain area is a moving subject detection area is determined according to distinctive subjects in image frames and motion vector detection positions on a screen (moving subject detection process). A description thereof will now be given with reference to FIGS. 5 and 6. In FIG. 5, reference numeral 501 designates a person who is standing still, and reference numeral 504 indicates an indicator that a face is being detected in this area. Reference numeral 502 designates a subject whose face is hidden and cannot be detected and who is moving and causes a change in images between frames to be significant. Reference numeral 503 designates a subject in an area whose characteristics such as hue, chroma, and brightness as an image are distinctive and which hardly moves.

Results of the extract, using the method described above, of distinctiveness calculation areas for use in obtaining the degree of distinctiveness are designated by reference numerals 505 to 510. The detection of motion vectors is the detection of differences between image frames (pixel moving amount) with respect to areas (reference numeral 511) provided at specific positions in a certain image. Motion vector detecting positions (areas 511) cover the entire screen so that the motion vectors can be detected. Among the distinctiveness calculation areas 505 to 510, a distinctiveness calculation area where the number of detected vectors whose value of moving amount of the moving vectors is equal to a greater than a threshold value 1 is equal to or greater than a threshold value 2 is determined to be a moving subject detection area.

In a case where distinctiveness calculation areas overlap like the areas designated by the reference numerals 508 to 510 or very close, and also a moving subject is detected in each of the distinctiveness calculation areas, a moving subject detection area is determined as one area 512. As described above, the subject 501 and the subject 503 do not move in the image frame. Thus, the detected amounts of motion vectors in the distinctiveness calculation areas designated by the reference numerals 505, 506, and 507 are very small, and hence they are not determined to be moving subject detection area. In the distinctiveness calculation areas designated by the reference numerals 508, 509, and 510, the number of detected vectors whose value of moving amount of the moving vectors is equal to or greater than the threshold value 1 is equal to or greater than the threshold value 2, and hence the distinctiveness calculation areas designated by the reference numerals 508, 509, and 510 are determined to be moving subject detection areas. Moreover, since the distinctiveness calculation areas overlap like the areas designated by the reference numerals 508, 509, and 510, they are determined to be one area (moving subject detection area). Thus, the number of the moving subject detection area is one (512).

Note that in the present embodiment, the image pickup apparatus 101 has the pan-tilt mechanism as shown in FIG. 1. While a subject is being tracked by panning and tilting, a motion occurs on a light-incident surface by the pan-tilt mechanism driving even in a case where the subject does not move. As a result, the output value of motion vector at each motion vector detecting position is large. Moreover, in a case where a user holds the image pickup apparatus 101 by hand and moves to take an image, an image blur occurs due to camera shake. Thus, even in a case where a subject does not move, a motion occurs on the light-incident surface, and the output value of motion vector at each motion vector detecting position is large. Accordingly, in the present embodiment, the amount of motion vector calculated by removing an image blur resulting from panning/tilting or camera shake is used to determine whether or not a certain area is a moving subject detection area.

Figure 6:
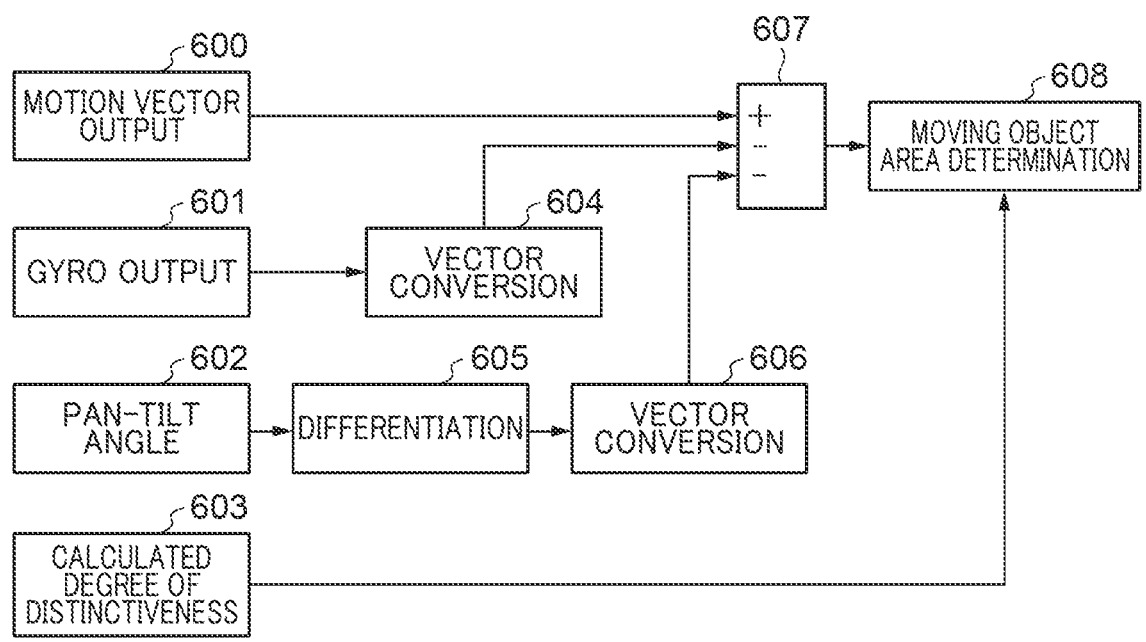
FIG. 6 is a diagram useful in explaining the moving subject detecting process according to the first embodiment.

A description thereof will now be given with reference to FIG. 6. As for a gyro output 601, which is an output from a gyro, an angular velocity is multiplied with a conversion gain (vector conversion 604) to calculate an image plane blur pixel so as to make the systems of units of the gyro output 601 and a motion vector output 600 coincide with each other. A pan-tilt angle 602 is subjected to differentiation 605 to calculate a pan-tilt angular velocity. Then, the pan-tilt angular velocity is multiplied by a conversion gain (vector conversion 606) to obtain an image plane blur pixel. At this time, the pan-tilt angular velocity and the gyro angular velocity (gyro output 601) are, based on the pan-tilt angle, subjected to axis transformation into blur components on the light-incident surface to calculate a blur angular velocity that can be expressed as a coordinate system (vertical axis, horizontal axis) on the light-incident surface. An adder-subtractor 607 subtracts the gyro output 601 subjected to the vector conversion and the pan-tilt angular velocity subjected to the vector conversion from each motion vector output result, and inputs a result to a moving object area determination 608. A calculated degree of distinctiveness 603 calculated for the distinctiveness calculation area is also input to the moving object area determination 608. Thus, whether or not the area is a moving subject detection area is determined using the method described with reference to FIG. 5.

From each motion vector in the moving subject detection area, the moving amount of each motion vector in the moving subject detection area and its reliability are also calculated. All the motion vectors detected in the moving subject detection area are classified into several sections according to ranges of motion vector values. Then, a frequency distribution process in which the appearance frequencies of motion vector values belonging to each section are arranged is carried out. A description of the frequency distribution process will now be given with reference to FIG. 7 (right). The horizontal axis and the vertical axis of a graph in FIG. 7 (right) represent the moving amount (pixel) and the frequency, respectively. In a histogram, in a section in which the detected numbers (frequencies) of motion vectors are equal to or greater than a threshold value indicated by reference numeral 701, a section 702 where the distribution is concentrated the most is set as a moving subject detection area. The moving amount of a typical motion vector of the moving subject is calculated based on the average value of the moving amounts of a motion vector in the set moving subject detection area 702. The reliability of the moving amount of the typical motion vector (also referred to merely as the typical vector) is also calculated from the variance value of the moving amounts of all the motion vectors in the moving subject detection area. Here, when the variance value is large, it is determined that the reliability is low, and when the variance value is small, it is determined that the reliability is high. Note that FIG. 7 (left) shows an example in which motion vectors are detected in the moving subject detection area.

Then, in S404, it is determined whether or not a subject to be tracked, which is a subject to be a target of tracking, has been detected among the subjects detected in S401. When the subject to be tracked has been detected (YES), the process proceeds to S405. When the subject to be tracked has not been detected (NO), the process proceeds to S406. Note that the subject to be tracked is set as described hereafter.

<The User Sets the Subject to be Automatically Tracked/ Automatically Shot>

The user can set the subject to be tracked (for example, a specific animal such as a dog or cat) via a dedicated application provided in the external apparatus 301. A configuration in which automatic tracking/automatic shooting is started when the subject to be tracked set by the user is detected in S401 may be adopted. Alternatively, a configuration by which the user can check persons registered in advance on the dedicated application, and designate a specific person subject (specific subject) to be tracked may be adopted. All of subjects that can be detected by the image pickup apparatus 101 may be set as subjects to be tracked. A configuration which enables the user to set a plurality of specific subjects may also be adopted.

<The Image Pickup Apparatus Automatically Sets the Subject to be Automatically Tracked/Automatically Shot>

For example, information on subjects shot in the past by the image pickup apparatus 101 may be stored, and the subject to be tracked may be automatically determined from the information on the subjects shot in the past every time automatic tracking/automatic shooting is performed. In this case, if a specific animal was detected at high frequency in the past, the training processor unit 219 may learn that it is an important subject for the user, and the specific animal may be automatically set as the subject to be tracked. Alternatively, to comprehensively shoot various types of subjects, subjects that have been shot are classified according to time, and a subject that has been infrequently shot may be determined to be the subject to be tracked. On the other hand, a subject that has been frequently shot may be determined to be the subject to be tracked and automatically tracked/automatically shot.

In S405, the pan-tilt drive unit 205 drivingly controls the tilt rotation unit 104 and the pan rotation unit 105 to control the pan-tilt angle such that the detected subject is kept inside a predetermined range of the screen, and thus the subject to be tracked is tracked. The subject to be tracked is tracked by obtaining subject positions detected for respective frames. To smoothly track the subject between consecutive image frames, the image pickup apparatus 101 is moved to the target tracking position of the subject to be tracked at a timing for each frame. The target tracking position of the subject to be tracked is set in the center of the screen so as to make it difficult for the subject to be tracked to leave the screen. After subject tracking has been carried out, the process proceeds to S408.

On the other hand, it is determined in S406 whether or not a moving subject to be tracked, which is a moving subject to be a target of tracking, has been detected among the moving subjects detected in S403. When the moving subject to be tracked has been detected (YES), the process proceeds to S407. When the moving subject to be tracked has not been detected (NO), the process proceeds to S413, to end the shooting mode process and end the present processing, and shift to a wait state for waiting for a next image pickup cycle. Whether or not the subject is the subject to be tracked is determined as described hereafter.

<Determine Whether or not the Moving Subject is the Subject to be Shot Using Positional Information in Previous Subject Detection>

For example, the determination is made as described below. Previous subject information detected in S401 in the past is stored. In the case where it is determined in S404 that there is no subject to be tracked, it is determined whether or not there is any subject to be tracked in immediately preceding several frames in the past. In a case where there is a subject to be tracked in the immediately preceding frames in the past, this moving subject is determined to be the subject to be tracked. In a case where no moving subject has been detected, a moving subject detected near the moving subject detection area in the past is determined to be the subject to be tracked, so that the moving subject can be sequentially tracked.

<Determine Whether or not the Moving Subject is the Subject to be Shot Based on the Continuation of the State where No Subject has been Detected>

For example, the determination is made as described below. Previous subject information detected in S401 in the past is stored. Information on information on whether the move or motions were large or not and information about the motions of objects are also stored. In a case where the previous subject to be tracked was detected for a predetermined period of time or longer in the past, in S404 the previous subject to be tracked is determined to be the subject to be tracked although no subject has been detected up to the present. The moving amount and moving frequency of the stored previous subject to be tracked are also stored at the same time. In a case where the moving amount and moving frequency of the previous subject to be tracked are large, the previous subject to be tracked is determined to be the moving subject to be tracked.

In S407, the pan-tilt drive unit 205 drivingly controls the tilt rotation unit 104 and the pan rotation unit 105 and controls the pan-tilt angle such that the position of the detected moving subject is kept inside a predetermined range of the screen. Thus, tracking of the moving subject is carried out.

To track the moving subject, the position of the moving subject detected in every frame is obtained to update the track control amount (track amount). The pan-tilt angle is controlled to position the moving subject in the center of the screen so as to make it difficult for the moving subject to leave the screen. To perform smooth subject tracking between consecutive frame images, the track control amount (track amount) is updated at a timing for each frame.

The track control amount (track amount) may be updated according to the moving amount and reliability of the typical vector detected in S403. In this case, when the calculated reliability of the motion vector is high, the track control amount (track amount) is added (changed) based on the displacement of the typical vector. As a result, the moving amount of the moving subject can be controlled to be small. The track control amount (track amount) is controlled to increase in a case where, based on the position of the motion vector of the moving subject and the direction (orientation) of the motion vector of the moving subject, the motion vector heads in such a direction as to go away from the target track position (for example, the center of the screen). On the other hand, the track control amount (track amount) is controlled to decrease in a case where the motion vector heads toward the target track position (for example, the center of the screen). As a result, the moving subject can be kept in the vicinity of the target track position. After tracking of the moving subject is carried out, the process proceeds to S408.

In S408, a score for determining whether or not to perform automatic shooting is calculated based on the detection information on the specific subject and the detection information on the moving subject. In S409, it is determined whether or not the score is equal to or greater than a predetermined value. In a case where the score is smaller than the predetermined value (NO), the process proceeds to S413 to end the process, and shift to a wait state for waiting for the next image pickup cycle. On the other hand, in a case where the score is equal to or greater than the predetermined value (YES), composition adjustment is made in S410, a shooting method is determined in S411, and a shooting process is carried out in S412. The process then proceeds to S413 to end the shooting mode process, and shift to a wait state for waiting for the next image pickup cycle. A description will now be given of how the score is calculated.

<Calculation of the Score for Determining Whether to Trigger Automatic Shooting>

A description will now be given of the determination as to whether or not to perform automatic shooting. First, a description will now be given of the determination based on a neural network. The neural network is used in predicting an output value from an input value. The neural network is trained by being given a number of sets of an input and training data as a model output for the input, to the neural network. The training is performed by the training process unit 219. By the neural network being trained to be a trained model, a prediction that follows learning rules can be output for a new input.

In the determination based on the neural network, feature values based on an image shot in the present angle of view, a scene, and the state of the image pickup apparatus 101 are given as inputs to neurons in an input layer. Then, an output result (the value of an output), which is output from an output layer via calculations based on the principle of forward propagation of a multilayer perceptron, is obtained. When the value of the output is equal to or greater than a predetermined threshold value, it is determined that the score is equal to or greater than the predetermined value (YES in S409), and it is determined that automatic shooting will be performed. Note that image data output from the image pickup unit 206 may be directly input as the feature value to the neural network, or information on a subject detected based on image information may be input as the feature value to the neural network.

Examples of the feature values as the inputs include the present zoom magnification, the recognition result of an ordinary object in the present angle of view, a face detection result, the number of faces shot in the present angle of view, the degree to which a face is smiling/eyes are closed, a face angle, a face authentication 1D number, and the angle of a subject person's line of sight. A scene determination result, the time that has elapsed since the last shooting, the current time, GPS positional information and the amount of change from the last shooting position, the present audio level, a person who is uttering voice, clapping hands, information indicating whether or not cheers are being raised, and so forth may also be used. Vibration information (acceleration information, the state of the image pickup apparatus 101), environmental information (temperature, atmospheric pressure, illumination, humidity, the amount of ultraviolet radiation), and so forth may be input to the neural network.

These feature values are converted into certain numeric values, and the numeric values are given to respective neurons in the input layer of the neural network. Accordingly, the same number of neurons in the input layer as the number of feature values described above are required. Note that for the determination based on the neural network, a method in which the weight parameter for connection between neurons is changed according to settings on autotracking shooting described below may be adopted. Alternatively, a simple score calculation rule that the feature values (information) are multiplied by a fixed gain, and the multiplication results are added up to calculate the score may be adopted.

Here, the feature values to be input are information on, for example, the recognition result of an ordinary object, a face detection result, the number of faces shot in the present angle of view, the degree to which a face is smiling/eyes are closed, a face angle, a face authentication 1D number, and the angle of a subject person's line of sight. A score for determining the shooting timing may also be calculated via the determination via the neural network, the score calculation rule, or the like, and when this score becomes equal to or greater than greater than a score in the last shooting, shooting may be started. Shooting may be performed at regular time intervals in a case where a score has continued to be equal to or greater than a predetermined value for a predetermined period of time. Shooting may also be performed in a case where the feature values (e.g., the degree of smiling, the number of faces) has changed.

Also in a case where no specific subject is detected in S401, whether or not to give a trigger for starting shooting can be determined based on the moving subject detected in S403. For example, the determination is made as described below. Previous subject information detected in S401 in the past is stored. It is determined whether or not there is any subject to be tracked in immediately preceding several frames in the past. In a case where there is a subject to be tracked in the immediately preceding frames in the past or a case where a moving subject is detected in the vicinity of a moving subject detection area in the past, the moving subject is determined to be a moving subject to be automatically shot. Once the moving subject has been determined to be a moving subject to be automatically shot, a moving subject in the vicinity of a moving subject detection area in the previous frame may also be determined to be a subject to be automatically shot. At the instant (time) when the motion of the moving subject to be automatically shot slows or stops, it can be determined that the moving subject will be automatically shot.

A description will now be given of adjustment of composition performed in S410 and determination of shooting method performed in S411.

<Determination of Composition and Adjustment of Composition>

The shooting method is determined based on the subject information detected in S401 and the information on the moving subject detected in S403.

<Shooting Composition in the Case where the Specific Subject has been Detected>

Examples thereof will be listed below. (1) When there is one subject to be shot, and the subject is not moving, composition is adjusted by driving the pan-tilt drive unit 205 to perform the pan-tilt operation (panning and tilting) and driving the zoom drive unit 202 to zoom in or out based on face detection of the subject. (2) When there is one subject to be shot, and the subject is moving a lot around the moving subject detection area and moving not in a fixed direction, composition is adjusted by driving the zoom drive unit 202 to make the subject smaller and driving the pan-tilt drive unit 205 to perform the pan-tilt operation so that that the subject can be positioned in the center of the image. (3) When there is one subject to be shot, and the subject is moving a lot around the moving subject detection area and moving in a fixed direction, composition is adjusted by driving the zoom drive unit 202 to make the subject smaller and driving the pan-tilt drive unit 205 to perform the pan-tilt operation so as to make space in the direction in which the subject is moving.

(4) When there is a plurality of subjects to be shot, and the subjects are not moving in a fixed direction, composition is adjusted by driving the zoom drive unit 202 to make the subjects smaller and driving the pan-tilt drive unit 205 to perform the pan-tilt operation. (5) When there is a plurality of subjects to be shot, and the subjects are not moving, composition is adjusted by driving the pan-tilt drive unit 205 to perform the pan-tilt operation and driving the zoom drive unit 202, based on face detection of each subject. (6) When there is a plurality of subjects to be shot, and the subjects are moving in a fixed direction, the zoom drive unit 202 is driven to make the subjects smaller, and the tracking amount is calculated based on the direction in which the subjects are moving. Then, based on the calculated tracking amount, the pan-tilt drive unit 205 drivingly controls the pan-tilt rotation unit 205 during shooting. Moreover, composition is adjusted by driving the pan-tilt drive unit 205 to perform the pan-tilt operation and driving the zoom drive unit 202 to zoom in or out.

<Shooting Composition in the Case where No Specific Subject has been Detected but the Moving Subject has been Detected>

Examples thereof will be listed below. (1) When there is one moving subject, which is moving a lot around the moving subject detection area, and the motions around the moving subject detection area do not have a certain correlation, composition is adjusted by driving the zoom drive unit 202 to make the angle of view wider and driving the pan-tilt drive unit 205 to perform the pan-tilt operation so that the subject can be positioned in the center of the image. (2) When there is one moving subject, which is moving a lot around the moving subject detection area, and the motions around the moving subject detection area are in a fixed direction, composition is adjusted so as to make space in the direction in which the moving subject is moving. Namely, composition is adjusted by driving the zoom drive unit 202 to make the angle of view wider and driving the pan-tilt drive unit 205 to perform the pan-tilt operation. (3) When there is a plurality of moving subjects, and the motions of the respective moving subjects do not have a certain correlation, composition is adjusted by driving the zoom drive unit 202 to make the angle of view wider and driving the pan-tilt drive unit 205 to perform the pan-tilt operation. (4) When there is a plurality of moving subjects, the motions of the moving subjects have a certain correlation, and the moving subjects are moving in a fixed direction, the center of gravity of the moving subjects is calculated. Then, composition is adjusted by driving the pan-tilt drive unit 205 to perform the pan-tilt operation so that the center of gravity can be positioned in the center of the image. (5) When a moving subject is large in size (equal to or greater than a predetermined value), composition is adjusted by driving the zoom drive unit 202 to make the angle of view wider. (6) When moving subject are positioned through the entire image, composition is adjusted by driving the zoom drive unit 202 to make the angle of view wider and driving the pan-tilt drive unit 205 to perform the pan-tilt operation.

<Determination of the Shooting Method>

In S411, the shooting method is determined based on the subject information obtained in S401 and the information on the moving subject determined in S403. For example, in a case where the subject (person) is standing still, still image shooting is performed, and in a case where the subject is moving, movie shooting or still image shooting while panning is performed.

<Determination of the Shooting Method in the Case where the Specific Subject has been Detected>

Examples thereof will be listed below. (1) When there is one specific subject to be shot, and the specific subject is not moving, shooting is performed while the pan-tilt operation being stopped. (2) When there is one specific subject to be shot, and the specific subject is moving a lot around the moving subject detection area and the motions do not have a certain correlation, shooting is performed while the pan-tilt operation being stopped. (3) When there is one specific subject to be shot, and the specific subject is moving a lot around the moving subject detection area and moving in a fixed direction, the pan-tilt drive unit 205 is driven, during still image shooting, based on the result of calculation of the motion vector of the specific subject immediately before exposure, and movie shooting (or still image shooting while panning) is performed while the pan-tilt operation is performed in the fixed direction. (4) When there is a plurality of specific subjects to be shot, and the motions of the specific subjects do not have a certain correlation, shooting is performed while the pan-tilt operation being stopped. (5) When there is a plurality of specific subjects to be shot, the motions of the specific subjects have a certain correlation, and the specific subjects are moving in a fixed direction, the pan-tilt drive unit 205 is driven, during still image shooting, based on the result of calculation of the motion vector of each specific subject immediately before exposure, and movie shooting (or still image shooting while panning) is performed while the pan-tilt operation is performed in the fixed direction.

<How to Determine the Shooting Method in the Case where No Specific Subject has been Detected but the Moving Subject has been Detected>

Examples thereof will be listed below. (1) When there is one moving subject, and the moving subject is moving a lot around the moving subject detection area and the motions do not have a certain correlation, movie shooting (or still image shooting while panning, same below) is performed while the pan-tilt operation being stopped. (2) When there is one moving subject, and the moving subject is moving a lot around the moving subject detection area and moving in a fixed direction, the pan-tilt drive unit 205 is driven, during still image shooting, based on the motion vector of the moving subject immediately before exposure, and movie shooting is performed while the pan-tilt operation is performed in the fixed direction. (3) When there is a plurality of moving subjects, and the motions of the moving subjects do not have a certain correlation, movie shooting is performed while the pan-tilt operation being stopped. (4) When there is a plurality of moving subjects, the motions of the moving subjects have a certain correlation, and the moving subjects are moving in a fixed direction, movie shooting is performed while the pan-tilt operation being stopped.

<Details on how to Adjust Composition and Determine the Shooting Method>

Figure 8A:
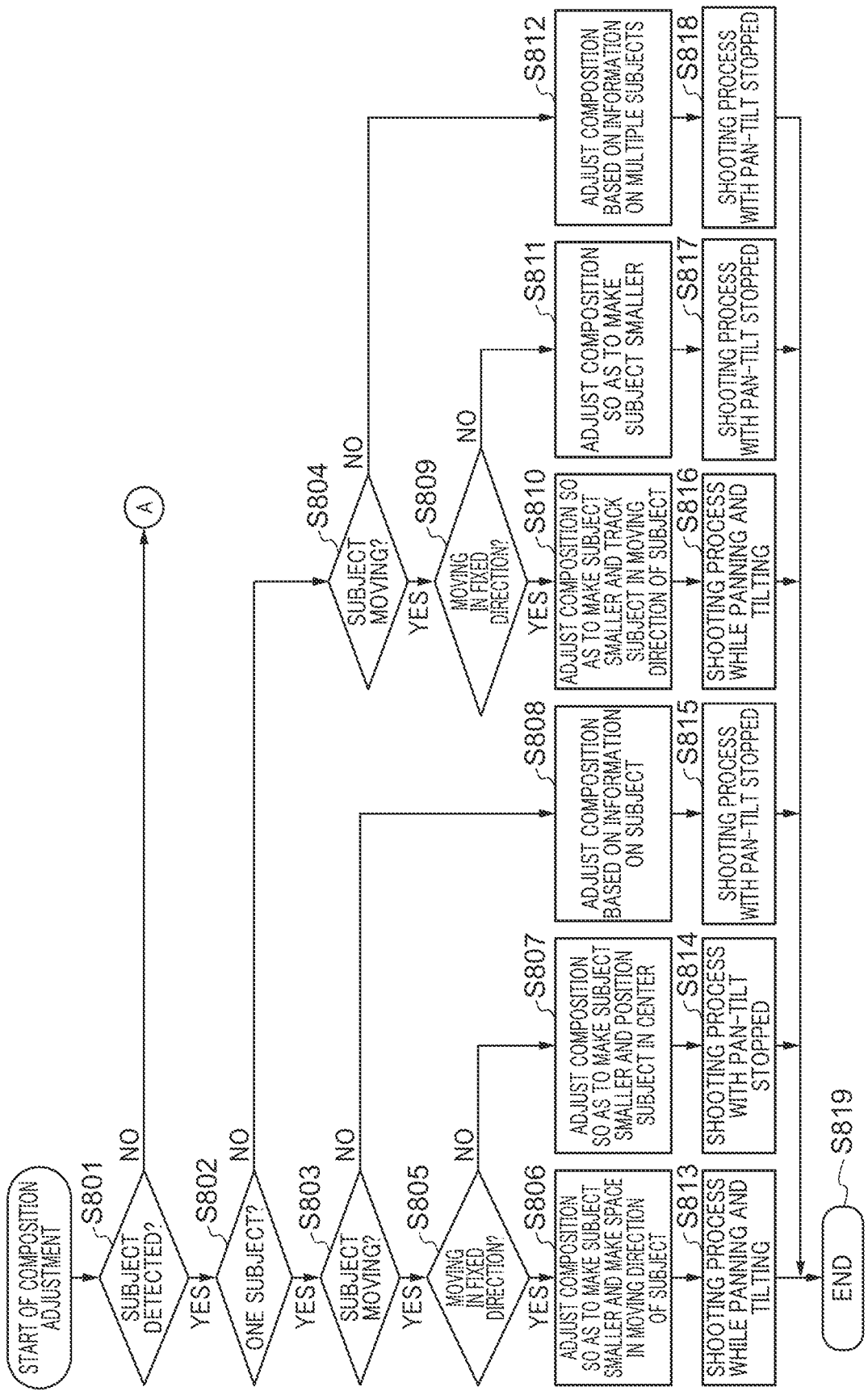
FIG. 8A is a flowchart showing a composition adjustment and a shooting method determination process according to the first embodiment.
Figure 8B:
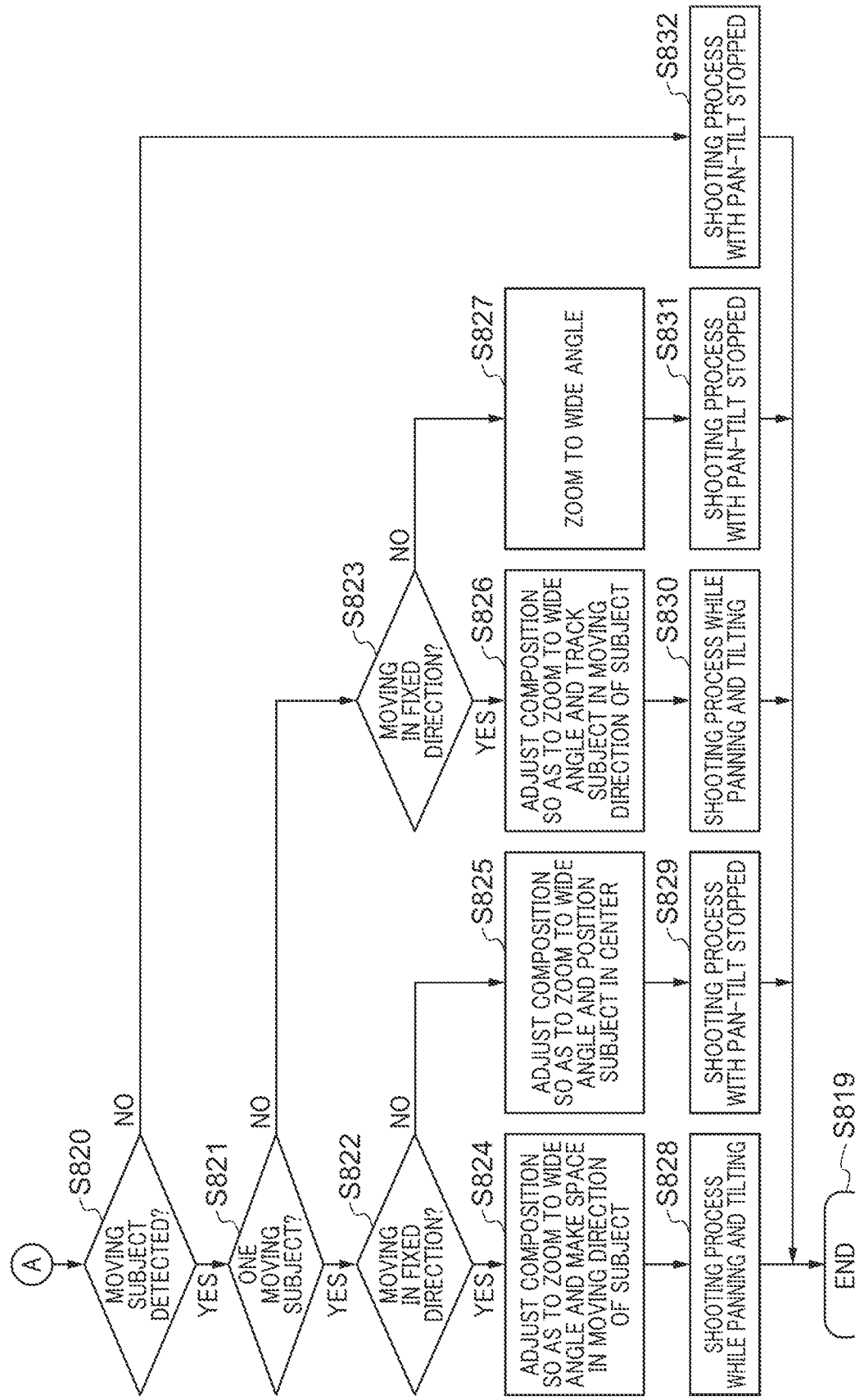
FIG. 8B is a flowchart showing the composition adjustment and the shooting method determination process according to the first embodiment.

FIGS. 8A and 8B are flowcharts showing the flow of a process in which the adjustment of composition in S410, the determination of the shooting method in S411, and the shooting process in S412 are combined together. The process in FIGS. 8A and 8B is carried out by mainly the image processing unit 207 and the control unit 223. Note that in S803 and S804, it is determined whether or not there is any motion, and more specifically, it is determined whether or not the size of a motion is equal to or greater than a predetermined value.

First, when the adjustment of composition is started, the process proceeds to S801, in which it is determined whether or not a specific subject (face) to be tracked, which is a subject to be a target of tracking, has been detected. In a case where it is determined that the specific subject to be tracked has been detected (YES in S801), the process proceeds to S802. On the other hand, in a case where it is determined that no specific subject to be tracked has been detected (NO in S801), the process proceeds to S820 in FIG. 8B.

Figure 7:
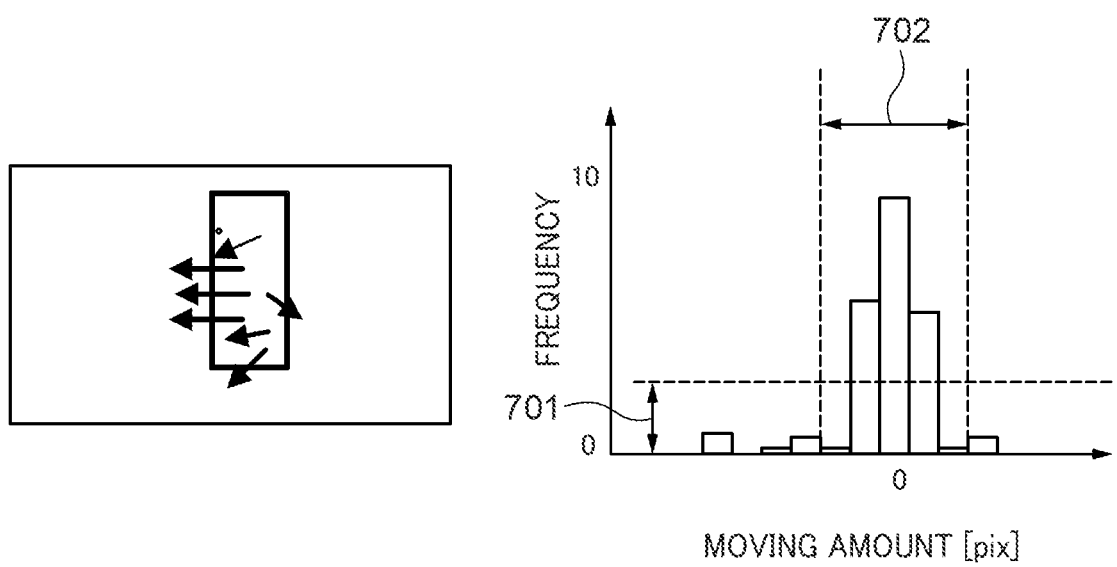
FIG. 7 is a view useful in explaining a frequency distribution process in the first embodiment.

Next, in S802, in a case where the number of detected specific subjects to be tracked is one (YES), the process proceeds to S803. On the other hand, in a case where the number of detected specific subjects to be tracked is plural (NO in S802), the process proceeds to S804. Then, in S803, in a case where the specific subject to be tracked is moving (YES), the process proceeds to S805. On the other hand, in a case where the specific subject to be tracked is not moving (NO in S803), the process proceeds to S808. Whether or not the specific subject is moving is determined by calculation using the method described with reference to FIGS. 5 to 7, and in a case where the frequency indicated in FIG. 7 is equal to or greater than the predetermined threshold value 701, it is determined that the specific subject is moving.

The case where the process proceeds to S808 is a case where the number of specific subjects to be shot is one, and the specific subject is not moving, and hence it is unlikely that the specific subject will fall outside the angle of view during shooting. Thus, in this case, in S808, the target composition adjustment position and target subject size of the specific subject to be shot in terms of the angle of view are determined based on detection of (and information about) the face which is the specific subject, and composition is adjusted by driving the pan-tilt drive unit 205 to perform the pan-tilt operation and driving the zoom drive unit 202 to zoom in or out. For example, the target composition adjustment position of the specific subject is calculated such that in a case where the specific subject faces front, the face is positioned in the center of the angle of view, and in a case where the specific subject faces sideways, space is made in the angle of view in the direction in which the face is oriented in a manner of rule of thirds for a frame.

The target face size is set to a predetermined face size such that the face appears large in the frame (for example, the size of the face covers 30% of the angle of view). The pan-tilt drive unit 205 is driven to perform the pan-tilt operation, and the zoom drive unit 202 are driven to zoom in or out so that the calculated target composition adjustment position and target face size can be realized, and the process proceeds to S815. In S815, the shooting process is carried out while the pan-tilt operation is stopped during still image shooting. After the shooting process is carried out, the process proceeds to S819 to end the process.

In S805, in a case where the detected specific subject to be tracked is moving in a fixed direction (YES), the process proceeds to S806. In a case where the detected specific subject to be tracked is moving not in a fixed direction (NO in S815), the process proceeds to S807. Determination of motion of the specific subject to be tracked is performed using the method described with reference to FIGS. 5 to 7. Information on the displacement of the typical vector in previous frames is stored, and when the variance value of the displacement of the typical vector detected within a predetermined period of time is smaller than a predetermined value, it is determined that the specific subject is moving in a fixed direction.

The case where the process proceeds to S806 is a case where the number of specific subjects to be shot is one, the specific subject is moving, and its motions are in a fixed direction, and hence it is unlikely that the specific subject will fall outside the angle of view during shooting. Thus, in this case, in S806, based on the direction in which the specific subject is moving, the target composition adjustment position is set at a position that is one-third of the frame away from the center of the angle of view in a direction opposite to the direction in which the specific subject is moving so that space can be made in the angle of view in direction in which the specific subject is moving. Moreover, in order to shoot the entire specific subject, the target face size is calculated such that the face has such a predetermined size as to appear small within the frame (for example, the face covers about 8% of the angle of view). Then, to achieve the calculated target composition adjustment position and target face size, composition is adjusted by driving the pan-tilt drive unit 205 to perform the pan-tilt operation and driving the zoom drive unit 202 to zoom in or out. After that, the process proceeds to S813.

In S813, even during still image shooting, the pan-tilt drive unit 205 is driven to perform the pan-tilt operation to prevent the blur of the subject or the displacement of the subject. For use in determining the pan-tilt drive amount at this stage, the values of the magnitudes of typical vectors detected immediately before shooting are stored. The tracking control amount (tracking amount) during still image shooting is determined based on the values of the magnitudes of the typical vectors in previous frames, and the zoom drive unit 202 is driven at a constant speed (a predetermined speed) to perform the pan-tilt operation during shooting. As examples in which a vector is calculated by referring to previous frames, the average value of the magnitudes of vectors may be obtained, or an addition process may be carried out such that a large weight is assigned to the latest data. A vector may be estimated using an approximate curve. After the shooting process is carried out, the process proceeds to S819 to end the process.

The case where the process proceeds to S807 is a case where the number of specific subjects to be shot is one, the specific subject is moving, and its motions are not in a fixed direction. In this case, if tracking is controlled in accordance with the direction in which the specific subjects is moving, it is highly likely that the specific subject will fall outside the angle of view. Thus, the pan-tilt operation is stopped without determining the target composition adjustment position based on the direction in which the specific subject is moving.

Alternatively, the target composition adjustment position is set in the center of the frame, while a threshold value at which tracking of the specific subject is started is set to a large value (for example, 50% of the distance from the center of the frame to the center of the specific subject in the frame), so as to make it hard for the pan-tilt operation to be performed. The target face size is also set so that the face can appear small within the frame (for example, the face size covers about 8% of the angle of view). To achieve the set target composition adjustment position and target face size, composition is adjusted by driving the pan-tilt drive unit 205 to perform the pan-tilt operation and driving the zoom drive unit 202. The process then proceeds to S814. In S814, the shooting process is carried out while the pan-tilt operation is stopped during still image shooting. After the shooting process is carried out, the process proceeds to S819 to end the process is ended.

In a case where the number of detected specific subjects to be tracked is two or more, in S804, it is determined whether or not the detected specific subject to be tracked are moving. In a case where the detected specific subject to be tracked are moving (YES in S804), the process proceeds to S809. On the other hand, in a case where the detected specific subject to be tracked are not moving (NO in S804), the process proceeds to S812. Whether or not the detected specific subject to be tracked are moving is determined using the method described with reference to FIG. 5 to FIG. 7. In a case where the frequency indicated in FIG. 7 is equal to or greater than the predetermined threshold value 701, it is determined that the specific subjects are moving.

The case where the process proceeds to S812 is a case where the number of specific subjects to be shot is plural, and the specific subjects are not moving, and hence it is unlikely that the specific subjects will fall outside the angle of view during shooting. Thus, in this case, the target composition adjustment positions and target subject sizes of the specific subjects to be shot in terms of the angle of view are determined in S812 based on detection of the faces (information about faces) of the detected plurality of specific subjects. Then, composition is adjusted by driving the pan-tilt drive unit 205 to perform the pan-tilt operation and driving the zoom drive unit 202. For example, the weighted target composition adjustment positions are calculated by multiplying the positions of the respective specific subjects by weighting coefficients and performing an addition process, and dividing it by the total value of the weighting coefficients. The weighting coefficients may be set based on the reliability of face detection, or the weighting coefficients may be set for respective face orientations and face sizes as well as respective specific persons registered in advance.

The face sizes may be calculated such that the smallest face size among the plurality of face sizes is a predetermined value, or the present zoom position may be kept without zooming in or out. Composition is adjusted by driving the pan-tilt drive unit 205 to perform the pan-tilt operation and driving the zoom drive unit 202 so that the plurality of faces can be positioned at the calculated target composition adjustment positions and have the calculated target face sizes. The process then proceeds to S818. In S818, the shooting process is carried out while the pan-tilt operation is stopped during still image shooting. After the shooting process is carried out, the process proceeds to S819 to end the process.

In S809, in a case where the detected specific subjects to be tracked are moving in a fixed direction (YES), the process proceeds to S810. In a case where the detected specific subjects to be tracked are moving not in a fixed direction (NO in S809), the process proceeds to S811. Determination of motion of the specific subjects to be tracked is performed using the method described above with reference to FIGS. 5 to 7, and information on the displacement of the typical vector in previous frames calculated with reference to FIG. 7 is stored. When the variance value of the displacement of the typical vector detected within a predetermined period of time is smaller than a predetermined value, it is determined that the specific subjects are moving in a fixed direction. At this time, a vector is calculated based on the values of motion vectors in all the detected specific subjects to determine whether or not all the detected specific subjects to be tracked are moving in a fixed direction.

The case where the process proceeds to S810 is a case where the number of specific subjects to be shot is plural, the plurality of specific subjects is moving, and their motions are in a fixed direction. It is thus unlikely that the specific subjects will fall outside the angle of view during shooting. Thus, in this case, in S810, based on the move of the specific subjects, tracking is controlled to be performed in the direction in which the specific subjects are moving. For example, the target tracking position is set using a signal obtained by multiplying the value of the typical value by a coefficient (for example, 0.5), and the target tracking position is calculated with respect to each frame. Then, the target composition adjustment position is calculated so that the specific subjects can be tracked by driving the pan-tilt drive unit 205 to perform the pan-tilt operation in accordance with the movement of the specific subjects. The target face size is also calculated so that the face can appear small within the frame (for example, the faces can cover about 8% of the angle of view).

The face size can be determined from the smallest value of the detected face sizes, or the average value of the detected face sizes may be calculated as the face size. Composition is adjusted by driving the pan-tilt drive unit 205 to perform the pan-tilt operation and driving the zoom drive unit 202 so that the specific subjects (faces) can be positioned at the calculated target composition adjustment position and have the calculated target face size. The process then proceeds to S816. In S816, even during still image shooting, the pan-tilt drive unit 205 is driven to perform the pan-tilt operation to prevent the blur of the subject or the displacement of the subject. For use in determining the pan-tilt drive amount at this stage, the values of the magnitudes of typical vectors detected immediately before shooting are stored. The tracking control amount (tracking amount) during still image shooting is determined based on the values of the magnitudes of the typical vectors in previous frames, and the zoom drive unit 202 is driven at a constant speed (a predetermined speed) to perform the pan-tilt operation during shooting. As examples in which the typical vector is calculated by referring to previous frames, the average value of motion vectors may be obtained, or an addition process may be carried out such that a large weight is assigned to the latest data. The typical vector may be estimated using an approximate curve. After the shooting process is carried out, the process proceeds to S819 to end the process.

The case where the process proceeds to S811 is a case where the number of specific subjects to be shot is plural, the specific subjects are moving, and their motions are not in a fixed direction. Thus, if tracking is controlled in accordance with the directions in which the specific subjects are moving, it is highly likely that the specific subjects will fall outside the angle of view. Thus, in this case, the pan-tilt operation is stopped without determining the target composition adjustment position based on the direction in which the specific subjects are moving. Alternatively, the barycentric position of the plurality of faces is calculated, and the target composition adjustment position with respect to the calculated barycentric position is set in the center of the frame, while a threshold value at which tracking of the specific subjects is started is set to a large value (for example, 50% of the distance from the center of the frame to the center of the specific subjects in the frame), so as to make it hard for the pan-tilt operation to be performed. Moreover, the target face size to be set is calculated so that the faces can appear small within the frame (for example, the face size covers about 8% of the angle of view). Then, to achieve the calculated target composition adjustment position and target face size, composition is adjusted by driving the pan-tilt drive unit 205 to perform the pan-tilt operation and driving the zoom drive unit 202. The process then proceeds to S817. In S817, the shooting process is carried out while the pan-tilt operation is stopped during still image shooting. After the shooting process is carried out, the process proceeds to S819 to end the process.

Note that in the processes in S813 to S818, in a case where there is high image blur such as a case where shooting is performed while the image pickup apparatus 101 is handheld, the pan-tilt operation is controlled by subjecting the pan-tilt drive control amount of the pan-tilt drive unit 205 to an addition process using the anti-vibration control amount from the gyro sensor.

<The Case where No Face (No Specific Subject) to be Tracked has been Detected>

Referring to FIG. 8B, a description will now be given of operations performed in a case where no specific subject (face) to be tracked has been detected (no face has been detected) (NO in S801). In S820, it is determined whether or not a moving subject to be tracked has been detected. In a case where a moving subject to be tracked has been detected (YES in S820), the process proceeds to S821. On the other hand, in a case where it is determined that no moving subject to be tracked has been detected (NO in S820), the process proceeds to S832. In S821, it is determined whether or not the number of detected moving subjects is one. In a case where the number of detected moving subjects is one (YES in S821), the process proceeds to S822. On the other hand, in a case where the number of detected moving subjects is not one (is plural) (NO in S821), the process proceeds to S823.

In the case where the process proceeds to S832, since there is no moving subject, composition is not adjusted, and the shooting process is carried out while the pan-tilt operation is stopped during still image shooting. After the shooting process is carried out, the process proceeds to S819 to end the process.

Then, in S822, in a case where the detected moving subject is moving in a fixed direction (YES), the process proceeds to S824. On the other hand, in a case where the detected moving subject is moving not in a fixed direction (NO in S822), the process proceeds to S825. Determination of motion of the moving subject can be performed using the method described with reference to FIG. 5 to FIG. 7. Information on the displacement of the typical vector in previous frames is stored, and when the variance value of the displacement of the typical vector detected within a predetermined period of time is smaller than a predetermined value, it is determined that the moving subject is moving in a fixed direction.

The case where the process proceeds to S824 is a case where the number of moving subjects to be shot is one, the moving subject is moving a lot, and its motions are in a fixed direction, and hence it is unlikely that the moving subject will fall outside the angle of view during shooting. Thus, in this case, in S824, based on the direction in which the moving subject is moving, the target composition adjustment position is set at a position that is one-third of the frame away from the center of the angle of view in a direction opposite to the direction in which the moving subject is moving so that space can be made in the angle of view in direction in which the moving subject is moving. Moreover, in order to shoot the entire moving subject, an angle of view at which the moving subject detection area for the moving subject is of a predetermined size is calculated as the target zoom position. Then, to achieve the calculated target composition adjustment position and target zoom position, composition is adjusted by driving the pan-tilt drive unit 205 to perform the pan-tilt operation and driving the zoom drive unit 202 to zoom out (zoom to wide angle). After that, the process proceeds to S828.

In S828, even during still image shooting, the pan-tilt drive unit 205 is driven to perform the pan-tilt operation to prevent the blur of the moving subject or the displacement of the moving subject. For use in determining the tracking control amount at this stage, the values of the magnitudes of typical vectors in previous frames are stored. The tracking control amount during still image shooting is determined based on the values of the magnitudes of the typical vectors in previous frames. During shooting, the the pan-tilt drive unit 205 is driven at a constant speed (a predetermined speed) to perform the pan-tilt operation. As examples in which value of the magnitudes of a typical vector is calculated by referring to previous frames, the average value of the magnitudes of typical vectors may be obtained, or an addition process may be carried out such that a large weight is assigned to the latest data. A typical vector may be estimated using an approximate curve. After the shooting process is carried out, the process proceeds to S819 to end the process.

The case where the process proceeds to S825 is a case where the number of moving subjects to be shot is one, the moving subject is moving a lot, and its motions are not in a fixed direction. Thus, if tracking is controlled in accordance with the direction in which the moving subject is moving, it is highly likely that the moving subject will fall outside the angle of view. Thus, the target composition adjustment position is not determined based on the direction in which the detected moving subject is moving, and the pan-tilt operation is not carried out (the pan-tilt operation is stopped). Alternatively, the target composition adjustment position is set in the center of the frame, while a threshold value at which tracking of the moving subject is started is set to a large value (for example, 50% of the distance from the center of the frame to the center of the moving subject in the frame), so as to make it hard for the pan-tilt operation to be performed. In order to shoot the entire moving subject, an angle of view at which the moving subject detection area for the moving subject is of a predetermined size or larger is calculated as the target zoom position. To achieve the calculated target composition adjustment position and target zoom size, composition is adjusted by driving the pan-tilt drive unit 205 to perform the pan-tilt operation and driving the zoom drive unit 202 to zoom out (zoom to wide angle). The process then proceeds to S829. In S829, the shooting process is carried out while the pan-tilt operation is stopped during still image shooting. After the shooting process is carried out, the process proceeds to S819 to end the process.

In a case where the number of detected moving subjects to be tracked is plural (NO in S821), the process proceeds to S823. In S823, in a case where the moving subjects to be tracked are moving in a fixed direction (YES), the process proceeds to S826. On the other hand, in a case where the moving subjects to be tracked are not moving in a fixed direction (NO in S823) (namely, in a case where the moving subject to be tracked is moving irregularly), the process proceeds to S827. Determination of motion of the moving subjects to be tracked is performed using the method described with reference to FIG. 5 to FIG. 7. Information on the displacement of the typical vector in previous frames is stored, and when the variance value of the displacement of the typical vector detected within a predetermined period of time is smaller than a predetermined value, it is determined that the moving subjects are moving in a fixed direction. At this time, whether or not all the moving subjects are moving in a fixed direction may be determined by calculating the values of motion vectors of all the detected moving subjects.

The case where the process proceeds to S826 is a case where the number of moving subjects to be shot is plural, the moving subjects are moving a lot, and their motions are in a fixed direction. It is thus unlikely that the moving subjects will fall outside the angle of view during shooting. Thus, in this case, in S826, the pan-tilt drive unit 205 is drivingly controlled to track the moving subjects in the direction in which they are moving. For example, the target tracking position is set using a signal obtained by multiplying the value of the typical value by a coefficient (for example, 0.5), and the target tracking position is calculated with respect to each frame. Then, the target composition adjustment position is calculated so that the moving subjects can be tracked by driving the pan-tilt drive unit 205 to perform the pan-tilt operation in accordance with the movement of the moving subjects. In order to shoot the entire moving subjects, an angle of view at which the moving subject detection area for the moving subjects is of a predetermined size or larger is calculated and set as the target zoom position. To achieve the calculated and set target composition adjustment position and target zoom position, composition is adjusted by driving the pan-tilt drive unit 205 to perform the pan-tilt operation and driving the zoom drive unit 202. The process then proceeds to S830.

In S830, even during still image shooting, the pan-tilt drive unit 205 is driven to perform the pan-tilt operation to prevent the blur of the moving subject or the displacement of the moving subject. For use in determining the pan-tilt drive amount at this stage, the values of the moving amount of typical vectors in previous frames are stored. The tracking control amount (tracking amount) during still image shooting is determined based on the values of the moving amount of the typical vectors in previous frames, and the zoom drive unit 202 is driven at a constant speed (a predetermined speed) to perform the pan-tilt operation during shooting. As examples in which the moving amount of the typical vector is calculated by referring to previous frames, the average value of the moving amount of typical vectors may be obtained, or an addition process may be carried out such that a large weight is assigned to the latest data. The moving amount of the typical vector may be estimated using an approximate curve. After the shooting process is carried out, the process proceeds to S819 to end the process.

The case where the process proceeds to S827 is a case where the number of moving subjects to be shot is plural, the moving subjects are moving a lot, and their motions are not in a fixed direction. Thus, if tracking is controlled in accordance with the direction in which a specific moving subject is moving, it is highly likely that the moving subjects will fall outside the angle of view. Thus, in this case, the target composition adjustment position is not determined based on the directions in which the moving subjects are moving, and the pan-tilt operation is not carried out. In order to shoot the entire moving subjects, an angle of view at which the moving subject detection area for the moving subjects is of a predetermined size or larger is calculated and set as the target zoom position. To achieve the set target composition adjustment position and target zoom position, composition is adjusted by driving the pan-tilt drive unit 205 to perform the pan-tilt operation and driving the zoom drive unit 202. The process then proceeds to S831. In S831, the shooting process is carried out while the pan-tilt operation is stopped during still image shooting. After the shooting process is carried out, the process proceeds to S819 to end the process.

Note that in the processes in S828 to S832, in a case where there is high subject blur such as a case where shooting is performed while the image pickup apparatus 101 is handheld, the pan-tilt operation is controlled by subjecting the pan-tilt drive control amount to an addition process using the anti-vibration control amount from the gyro sensor.

As described above, composition is adjusted in S410, and the shooting method is determined in S411. In S412, shooting is started by following the shooting method determined in S411. At this timing, the control unit 223 controls the focus drive unit 204 to control auto focusing. A diaphragm control unit, a sensor gain control unit, and a shutter control unit, which are not shown, are used to control exposure such that the subject has an appropriate brightness. The image processing unit 207 performs various types of image processing such as auto white balance, noise reduction, and gamma correction. After the image processing is performed by the image processing unit 207, the process proceeds to S413, in which the process in the present image pickup cycle is ended and the process in the next image pickup cycle is waited for.

In a case where automatic movie shooting is performed, as with S410 described above, even while shot images are being recorded, images are shot while composition adjustment is made (framing) by performing the pan-tilt operation and driving the zoom drive unit 202, based on subject detection.

Moreover, in a case where automatic movie shooting is performed, in S490, whether or not to trigger shooting is determined based on various types of information, and the shooting process is carried out. However, there may be a case where shooting based on the determination in S409 is not performed because the state of the moving subject changed during the composition adjustment and/or the shooting process. Therefore, in the process after shooting, it is determined whether or not shooting based on a state closer to the state determined in S409 has been performed. In a case where a score calculated from an image after shooting is equal to or greater than the predetermined value, or a difference between the score calculated from an image after shooting and the score calculated in S409 is equal to or smaller than a predetermined value, it is determined that shooting has been successful.

On the other hand, in a case where the score is smaller than the predetermined value, it is determined that shooting has been unsuccessful, and information to this effect is stored as additional information for the image. Alternatively, a score determined again after shooting is stored as additional information for the image. In a case where it is determined that shooting has been unsuccessful, or in a case where the score obtained after shooting is smaller than a predetermined value, a shot image can be automatically deleted.

Moreover, the user may be allowed to view an image or download the image by operating a dedicated application installed in the external apparatus 301. Regarding image viewing, for example, a list of recommended images such as images whose scores are greater than a predetermined value may be displayed, and unsuccessful images may be not displayed.

Furthermore, in a case where the composition set in S410 does not match the composition determined based on an image obtained after shooting, it may be determined that the image is an unsuccessful image. Alternatively, it may be determined that an image whose score is smaller than a predetermined value is an unsuccessful image. In a case where a subject in an image is blurred to a predetermined degree or at a predetermined frequency, it may be determined that the image is an unsuccessful image. Whether or not an image is successful image may be determined using either a point spread function, a trained model which obtained by machine learning based on data on the presence/absence of blurry, or may be determined by edge detection using a differential filter.

Although in the present embodiment, the pan-tilt drive unit 205 is driven to pan/tilt the image pickup apparatus 101, the image pickup apparatus 101 may be configured to be driven in only one of the panning directions and the tilting direction. In this case, the operation of the pan-tilt drive unit 205 may controlled to position a subject in the center of an image, or when the direction in which the subject is moving matches the direction in which the pan-tilt drive unit 205 is driven, the operation of the pan-tilt drive unit 205 may be controlled to make space in the direction in which the subject is moving.

Second Embodiment

In the first embodiment described above, determination of shooting method is automatically performed by the image pickup apparatus 101 and then performs shooting. In the second embodiment, processing for a case where shooting is performed in response to an operation performed by the user is described. A button for triggering shooting is provided in the operating unit 210 of the image pickup apparatus 101, and when the user depresses the button, shooting is started. In a case where still image shooting is performed by the operation on the button, the shooting process is carried out in the same manner as the shooting process according to the first embodiment described with reference to FIG. 4.

Figure 9:
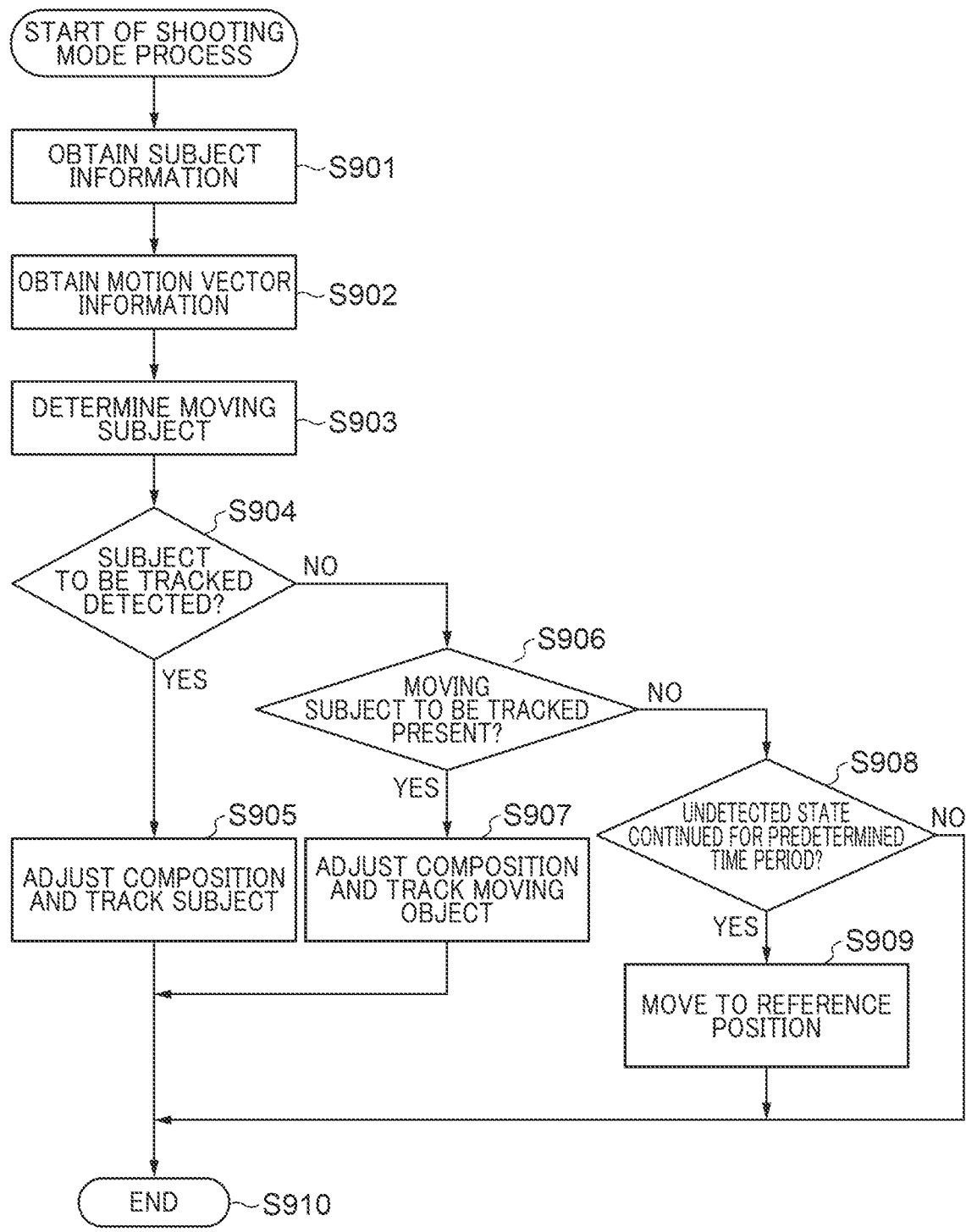
FIG. 9 is a flowchart showing a shooting mode process according to the second embodiment.

FIG. 9 is a flowchart showing a shooting mode process according to the second embodiment. The process in FIG. 9 is carried out by mainly the image processing unit 207 and the control unit 223. First, in S409 in FIG. 4, it is determined whether or not the button of the operating unit 210 has been depressed, and in a case where it is determined that the button has been depressed, the shooting process is carried out by carrying out the processes in S410 and the subsequent steps.

Referring to FIG. 9, a detailed description will now be given of the process in the case where movie shooting is performed in response to operation on the button. When movie shooting is started by operating the button, a shooting mode process is carried out. In S901, the image pickup unit 206 captures an image pickup signal as with S401 in FIG. 4. The image processing unit 207 performs image processing on the image pickup signal to generate an image for subject detection. Next, in S902, a motion vector is captured as with S402 in FIG. 4.

Then, in S903, the moving subject determination is made as with S403 in FIG. 4. After that, in S904, whether or not a specific subject to be tracked has been detected is determined as with S404 in FIG. 4. In a case where the specific subject to be tracked has been detected (YES in S904), the process proceeds to S905, in which it is determined the specific subject in movie shooting has been detected, and the pan-tilt rotation unit performs the pan-tilt operation to control tracking for a target composition value.

On the other hand, in a case where no specific subject to be tracked has been detected (NO in S904), the process proceeds to S906. In S906, whether or not a moving subject to be tracked has been detected as with S406 in FIG. 4. In a case where the moving subject to be tracked has been detected (YES in S906), the process proceeds to S907. In S905 and S907, as with a method described with reference to FIG. 8, based on various types of information on the specific subject and the moving subject, composition is adjusted by causing the pan-tilt drive unit 205 to drivingly control the pan-tilt rotation unit, and drivingly controlling the zoom drive unit 202 to zoom in or out.

On the other hand, in a case where it is determined in S906 that no moving subject to be tracked has been detected (NO), the process proceeds to S908. In S908, it is determined whether or not the state (no subject detected state) in which neither a specific subject nor a moving subject is detected has continued for a predetermined period of time. In a case where it is determined the no subject detected state has not continued for the predetermined period of time (NO in S908), the process proceeds to S910 to end the process, and shift to a wait state for waiting for the present process to be carried out in the next image pickup cycle. On the other hand, in a case where it is determined the no subject detected state has continued for the predetermined period of time (YES in S908), the process proceeds to S909.

In the case where the process proceeds to S909, it is unlikely that a subject will appear again in the present angle of view, and hence in S900, the pan-tilt rotation unit is positioned at a reference position, and the zoom lens is also positioned at a reference position. The reference position for the pan-tilt rotation unit may be either a position at which movie shooting is started or a position designated by the user operating a dedicated application installed in the external apparatus 301. The reference position may be a position at which a specific subject or a moving subject has been detected for the longest time within a detection time period before the no subject detected state. Namely, in the case where the state in which a subject to be shot cannot be determined has continued for the predetermined period of time, the pan-tilt drive unit 205 drivingly controls the pan-tilt rotation unit such that the amount of pan-tilt is a specific amount, and the zoom drive unit 202 is drivingly controlled to make the focal length equal to a specific length.

Third Embodiment

In the third embodiment, the user can use a dedicated application installed in the external apparatus 301 to set the frequency at which a moving subject is tracked and shot as in the first embodiment and the second embodiment described above.

Figure 10:
FIG. 10 is a view useful in explaining a display screen of an external apparatus for a user to make a setting according to the third embodiment.

The dedicated application displays a motion priority setting operating unit on a display screen of the external apparatus 301. As shown in FIG. 10, the user operation can make an ON/OFF setting for a motion priority mode as to whether or not to get the moving subject to be a target of shooting. In a case where the motion priority mode is set to ON, the moving subject is shot while being tracked as in the first embodiment and the second embodiment described above. In a case where the motion priority mode is set to OFF, the moving subject is not shot while being tracked as described above in the first embodiment and the second embodiment. In a case where the motion priority mode is set to OFF, it is always determined that there is no moving subject, and tracking shooting in which only a specific subject is shot while being tracked is performed.

Figure 11:
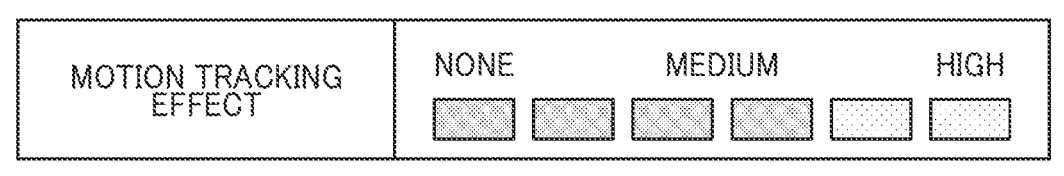

FIG. 11 shows an example of a display screen through which the user operation can set of a moving subject tracking effect in a phased manner. The criterion for the moving subject determination in S403 and S903 is changed according to the motion tracking effect setting. For example, the predetermined threshold value 701 for the vector determination in FIG. 7 is changed. For example, the predetermined threshold value 701 for the vector determination is gradually decreased by changing the motion tracking effect setting from "None" to "Strong". Namely, information indicating the degree of ease in detecting the moving subject can be set through a setting operation on a setting unit within the display screen. Then, the image processing unit 207 (moving subject detecting unit) detects a moving subject in an image based on a motion vector and the set information.

By changing the tracking speed during detection of a moving subject according to the moving subject tracking effect setting, the frequency at which the moving subject is tracked and shot and the amount of pan-tilt are changed. Moreover, in a case where the motion tracking effect is set to high, higher priority may be given to tracking of a moving subject than to tracking of a specific subject. For example, by interchanging the process in S404 and the process in S406 in FIG. 4 and interchanging the process in S405 and the process in S407 in FIG. 4, higher priority may be given to detection and tracking of a moving subject than to detection and tracking of a specific subject.

Figure 12:
FIG. 12 is a view useful in explaining a display screen of the external apparatus for the user to make a setting according to the third embodiment.

FIG. 12 shows an example of a display screen through which the user operation can set a scene mode in which shooting is performed. A sports mode, a portrait mode, and an animal mode can be selected as scene modes. For example, in a case where the sports mode or the animal mode is selected as the scene mode, the motion tracking effect is set to high so as to be suitable for a scene where there are relatively many motions of a subject. In a case where the portrait mode is selected as the scene mode, the motion tracking effect is set to low so as to be suitable for a scene where there are relatively few motions of a subject. Thus, by setting a shooting scene, shooting suitable for the shooting scene can be performed.

Fourth Embodiment

In the fourth embodiment, a determination process for a method different from the method for determining the moving subject according to the first embodiment described above is carried out. Note that the fourth embodiment is the same as the first embodiment except for the moving subject determination method, and therefore, the same features will not be described.

Figure 13:
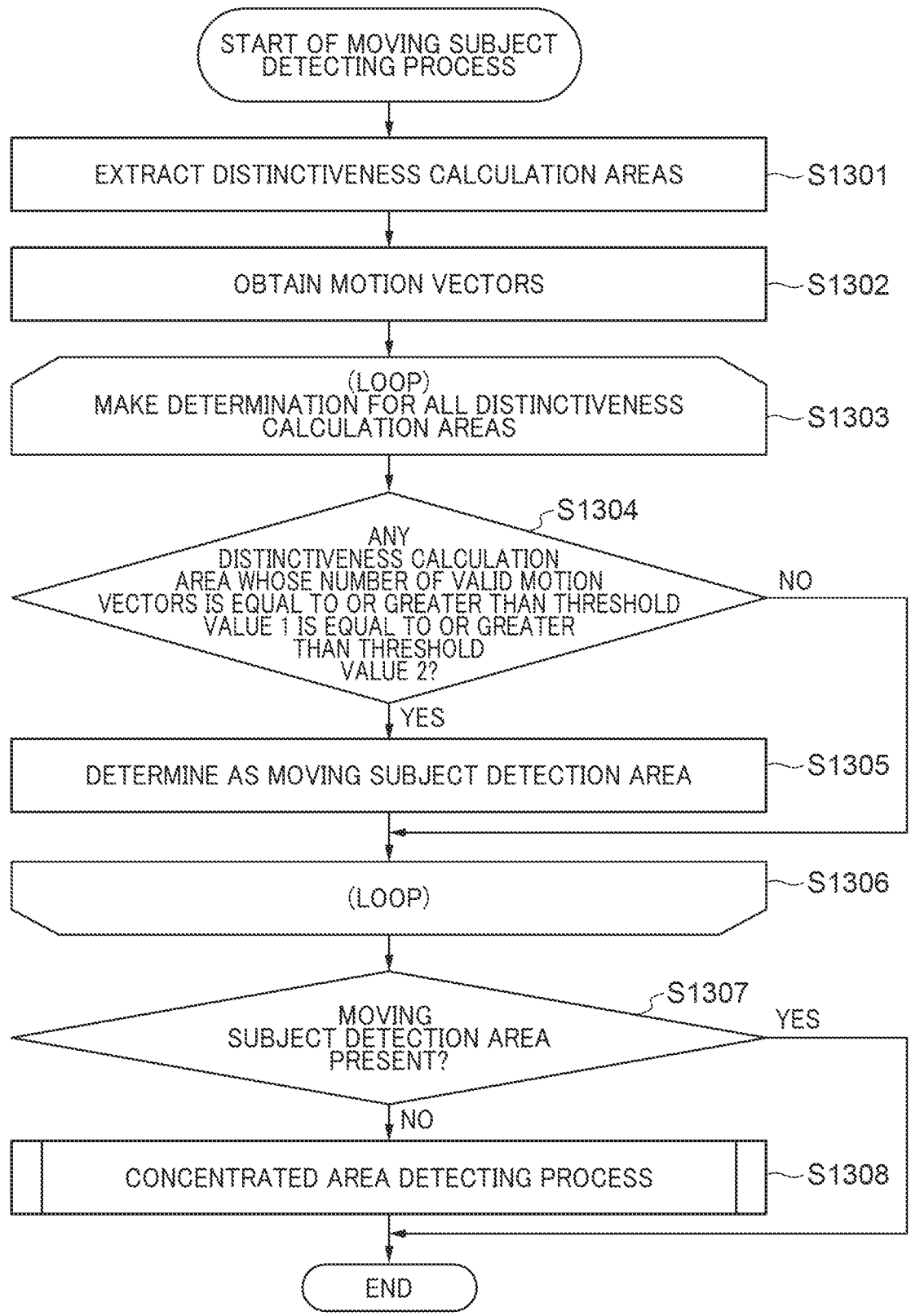
FIG. 13 is a flowchart showing a moving subject detecting process according to the fourth embodiment.

FIG. 13 is a flowchart showing a moving subject detecting process according to the fourth embodiment. Note that the image processing unit 207 carries out the process in FIG. 13. In the present embodiment, whether or not there is any moving subject detection area is determined using distinctiveness calculation areas in the image frame and motion vector detecting positions on the screen. First, in S1301, distinctiveness calculation areas for obtaining degree of distinctiveness are extracted using the method described above with reference to FIG. 5. Next, in S1302, motion vectors are captured as with S402 in FIG. 4 described above, and the process proceeds to S1303. In loop processing in S1303 to S1306, for all the distinctiveness calculation areas extracted in S1301, the following determination is made (S1303). Namely, it is determined in S1304 whether or not there is any distinctiveness calculation area in which the number of valid motion vectors whose moving amount value is equal to or greater than a threshold value 1 is equal to or greater than a threshold value 2. In a case where there is a distinctiveness calculation area in which the number of valid motion vectors whose moving amount value is equal to or greater than the threshold value 1 is equal to or greater than the threshold value 2 (YES in S1304), it is determined in S1305 that this distinctiveness calculation area is determined to be a moving subject detection area. On the other hand, in a case where it is determined in S1304 that there is no distinctiveness calculation area in which the number of valid motion vectors whose moving amount value is equal to or greater than the threshold value 1 is equal to or greater than the threshold value 2 (NO), the process proceeds to S1306 to continue the loop processing.

After the determination is made for all the distinctiveness calculation areas, namely, after the loop in S1303 to S1306 is ended, it is determined in S1307 whether or not there is any area determined to be a moving subject detection area. In a case where it is determined that there is no area determined to be a moving subject detection area (NO in S1307), the process proceeds to S1308, in which an area where valid motion vectors are concentrated is detected (concentrated area detection process). A description of this process will be given later with reference to FIG. 14. On the other hand, in a case where it is determined in S1307 that there is a moving subject detection area (YES), the process in FIG. 13 is ended.

Figure 14:
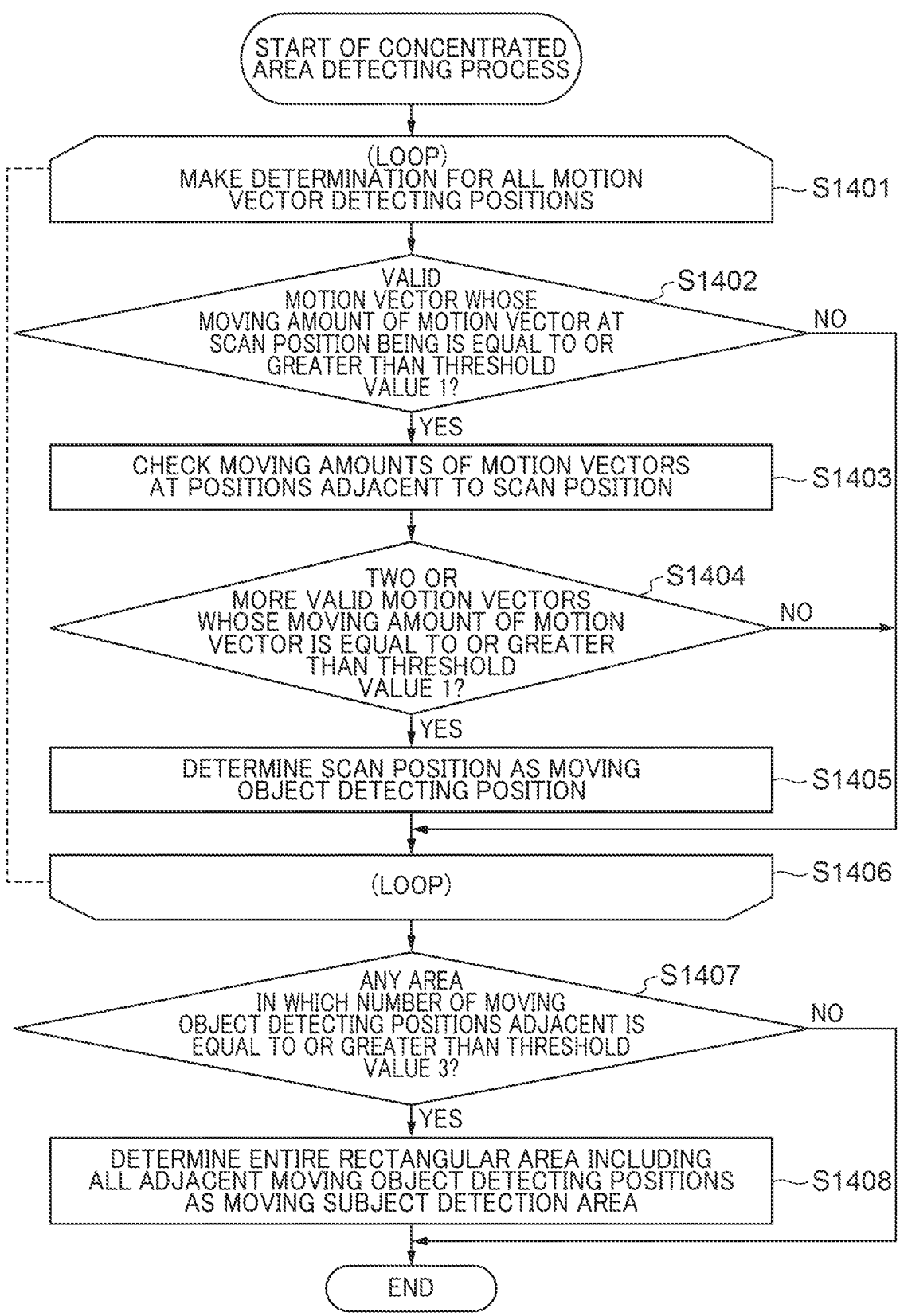
FIG. 14 is a flowchart showing a concentrated area detecting process according to the fourth embodiment.

FIG. 14 is a flowchart showing the process in which an area where valid motion vectors are concentrated is detected (the concentrated area detecting process) according to the fourth embodiment. The image processing unit 207 carries out the process in FIG. 14. Here, the determination as to a moving subject detection area is made by detecting an area where valid motion vectors, which is mentioned above, are concentrated is detected. A detailed description of the process will be now given.

In loop processing in S1401 to S1406, all of motion vector detecting positions are successively scanned to determine whether or not each motion vector detecting position is a moving object detecting position. In S1402, it is determined whether or not a motion vector at a scan position is a valid motion vector whose moving amount value is equal to or greater than a threshold value 1. In a case where the motion vector at the scan position is a valid motion vector whose moving amount value is equal to or greater than the threshold value 1 (YES in S1402), the process proceeds to S1403. In S1403, the moving amount of the motion vector at positions adjacent to the right, left, top, and bottom of the scan position are checked, the process proceeds to S1404. In S1402, in a case where the motion vector at the scan position is not a valid motion vector whose moving amount value is equal to or greater than the threshold value 1 (NO), the process proceeds to S1406. In S1404, it is determined whether or not there are two or more positions including a valid motion vector whose moving amount value of the motion vector is equal to or greater than the threshold value 1 among the positions adjacent to the right, left, top, and bottom of the scan position. In a case where there are two or more positions including the valid motion vector (YES in S1404), the process proceeds to S1405. In a case where there are not two or more positions including the valid motion vector (NO in S1404), the process proceeds to S1406. In S1405, it is determined that the scan position is a moving object detecting position. When scanning of all the motion vector detecting positions has been completed, the loop processing in S1401 to S1406 is ended, and the process proceeds to S1407.

Then, in S1407, the adjoining state of the moving object detecting positions determined using the method described above is checked, and in a case where there is an area to which the moving object detecting positions of the number of equal to or greater than a threshold value of 3 are adjacent (YES), the process proceeds to S1408. Otherwise (NO in S1407), the process in FIG. 14 is ended. Then, in S1408, the entire rectangular area including all the adjacent moving object detecting positions is determined to be a moving subject detection area.

Figure 15:
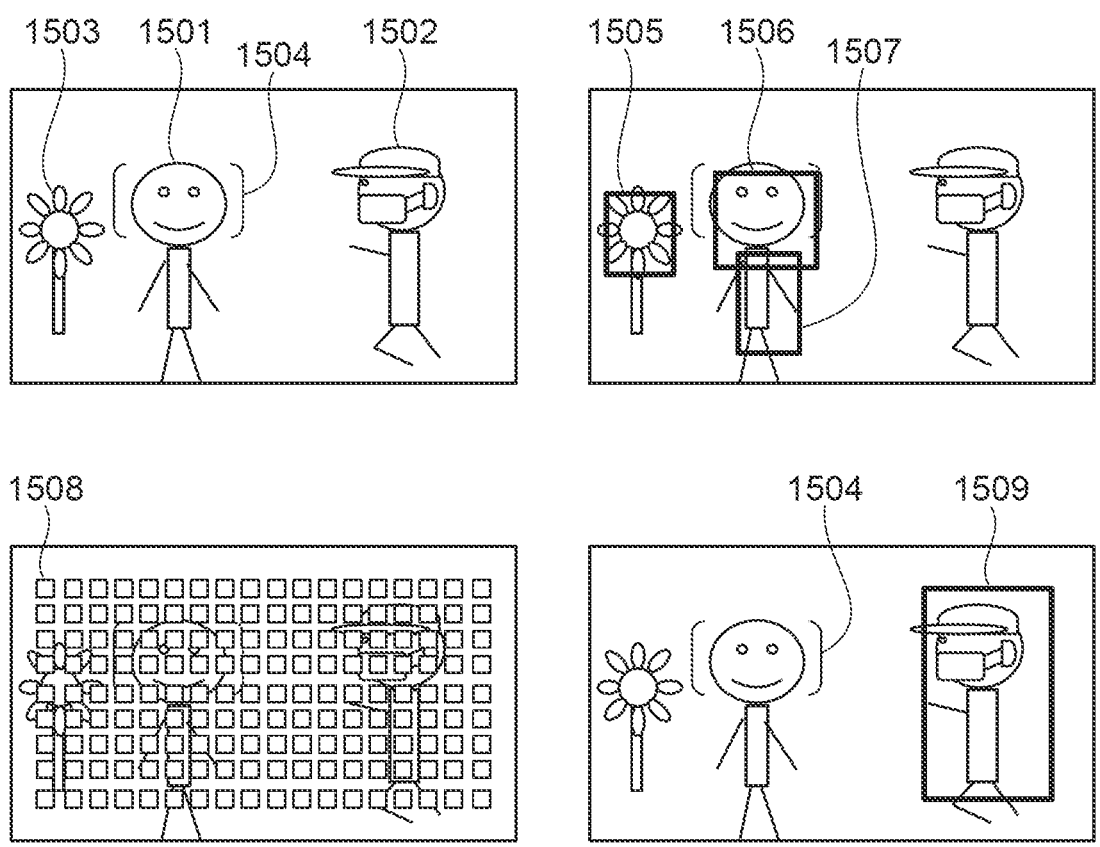
FIG. 15 is a view useful in explaining the moving subject detecting process according to the fourth embodiment.
Figure 16:
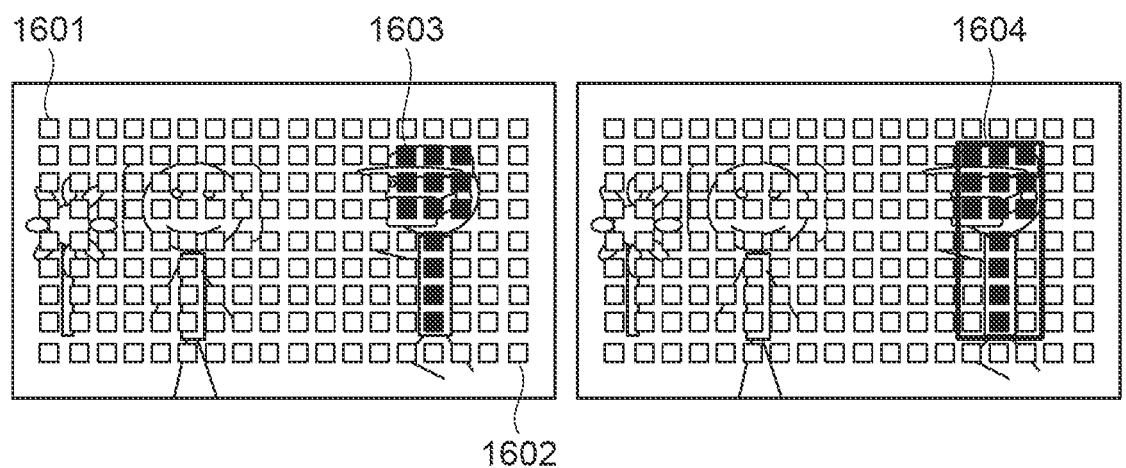
FIG. 16 is a view useful in explaining the moving subject detecting process according to the fourth embodiment.

FIGS. 15 and 16 are views useful in explaining the moving subject detecting process according to the fourth embodiment. A description will now be given of a process in which a moving subject detection area is determined using the method described above with reference to FIG. 13 and FIG. 14 with reference to specific examples. In FIG. 15, reference numeral 1501 designates a static person, and reference numeral 1504 designates an area where the face of the subject is detected. Reference numeral 1502 designates a subject whose face is hidden and cannot be detected and who is moving and causes a change in images between frames to be significant. Reference numeral 1503 designates a subject whose characteristics such as hue, chroma, and brightness are distinctive as an image in an area and which hardly moves.

Here, results of the extract, using the method according to the first embodiment described above, of distinctiveness calculation areas for use in obtaining the degree of distinctiveness are designated by reference numerals 1505 to 1510. Note that the subject designated by reference numeral 1502 is not determined to be an area where features such as hue, chroma, and brightness are not distinctive as compared to surrounding areas, and it is not extracted as a distinctiveness calculation area. The detection of motion vectors is the detection of differences between image frames (pixel moving amount) with respect to areas (reference numeral 1508) provided at specific positions in a certain image. Motion vector detecting positions (areas 1508) cover the entire screen so that the motion vectors can be detected. A moving subject detection area is determined as in the process in S1303 to S1306 in the flowchart of FIG. 13. Namely, among the areas designated by reference numerals 1505 to 1507 which are the distinctiveness calculation areas, a distinctiveness calculation area where the number of motion vectors whose moving amount value is equal to a greater than the threshold value 1 is equal to or greater than the threshold value 2 is determined to be a moving subject detection area. Note that as described above with reference to FIG. 3 and others, it tends to that the more distinct from the background, the distinctiveness is higher. In other words, the more distinctive from the background, the stronger the tendency of the distinctiveness to be equal to or greater than a predetermined value.

In a case where there is no area determined to be a moving subject detection area, an area where valid motion vectors are concentrated is searched for and determined to be a moving subject detection area. A detailed description of this process will now be given with reference to FIG. 16.

For areas designated by reference numerals 1601 to 1602, which are detecting positions for motion vectors located over the entire frame in FIG. 16, the moving amounts of motion vectors are successively checked. In a case where the area is an area where the moving amount value of a motion vector is equal to or greater than a threshold value 1, the moving amount values of motion vectors at four positions (areas) vertically and horizontally adjacent to the area are checked as well. In a case where it is determined that there are two or more positions where the moving amount value of a motion vector is equal to or greater than the threshold value 1 among the four positions vertically and horizontally adjacent to one area, a central position (the one area) is determined to be a moving object detecting position. Referring to FIG. 16, for example, a position designated by reference numeral 1603 has the moving amount value of a motion vector equal to or greater than the threshold value 1, and the moving amount values of motion vectors at the right and lower positions of the position 1603 are equal to or greater than the threshold value 1. As a result, the position 1603 is determined as to be a moving object detecting position.

This determination process is carried out for all the motion vector detecting positions. After the determination process is completed for all the motion vector detecting positions, a rectangular area including a collective area where the number of moving objects detection areas vertically and horizontally adjacent to one another is equal to or greater than a threshold value of 3 is determined to be a moving subject detection area. In the present embodiment, a rectangular area designated by reference numeral 1604 including an area where moving object detecting positions including the position designated by reference numeral 1603 are vertically and horizontally adjacent to one another is a moving subject detection area.

Although in the present embodiment described above, an area where the number of motion vector detecting positions at which the moving amount value of a motion vector is equal to or greater than the threshold value 1 and which are vertically and horizontally adjacent to one another is equal to or greater than the threshold value of 3 is searched for, and this area is determined to be a moving object detection area, the present invention is not limited to this. For example, a total of eight positions including the upper left, lower left, upper right, and lower right positions as well as the upper, lower, left, and right positions around a motion vector detecting position which is a reference position may be searched for. In a case where there are four or more positions at which the moving amount value of a motion vector is equal to or greater than the threshold value 1 out of the eight positions, the central position of the four positions may be determined to be a moving object detecting position. As for the determination of a moving subject detection area, it may be determined whether or not a moving object detecting position which is a reference position is adjacent to a moving object detecting position with respect to a total of eight positions including the upper left, lower left, upper right, and lower right positions as well as the upper, lower, left, and right positions.

Note that according to the method used in the present embodiment, a moving subject detection area is determined by searching for an area where valid motion vectors are concentrated only in a case where there is no valid motion vector in distinctiveness calculation areas. However, the present invasion is not limited to this. Even in a case where there is a valid motion vector in distinctiveness calculation areas, a moving subject detection area may be determined by searching for an area where valid motion vectors are concentrated. Moreover, information on moving subject detection areas in past may be held as previous moving subject detection areas, and the information on the previous moving subject detection areas as well as information on the present distinctiveness calculation areas and motion vectors may be used for the determination. Further, information on the detection of subjects such as persons and objects may be used to determine the present moving subject detection area.

A description will now be given of an example in which information on previous moving subject detection areas is used. For example, information on moving subject detection areas in previous five image frames is stored. Then, by using the stored information on the moving subject detection areas equally with the results of detection in the present image frame, a moving subject can be detected continuously as the same moving subject even in a case where there is an image frame in which the moving subject cannot be detected temporarily.

A description will now be given of an example in which information on the detection of subjects such as persons and objects is used. For example, in a case where a subject such as a person or an object can be detected in a certain subject detection area, an area overlapping the subject detection area, a distinctiveness calculation area close to the area, or a moving subject detection area detected using motion vectors is treated as a valid detection area. Thus, more accurate detection results can be obtained. In addition, for example, information on subject detection areas in previous five image frames stored and used equally with detection results in the present image frame. As a result, a more accurate moving subject detection result can be obtained even in a case where there is an image frame in which a subject cannot be detected temporarily.

As described above, according to the present embodiment, a target (subject) to be shot can be more reliably detected by detecting valid motion vectors in distinctiveness calculation areas to determine a moving subject detection area. In a case where there is no valid motion vector in distinctiveness calculation areas, a moving subject detection area can be determined by searching for an area where valid motion vectors are concentrated for irrespective of distinctiveness. As a result, a moving subject can be detected even in a scene where a subject to be shot is blending in to the background. Moreover, a subject to be shot can be more accurately detected by determining a moving subject detection area using information on previous moving subject detection areas and information on the detection of subjects such as persons and objects.

Fifth Embodiment

In the fifth embodiment, a determination process performed by a method different from the moving subject determination method according to the first embodiment described above is carried out. Note that the fifth embodiment is the same as the first embodiment except for the operation of the image pickup apparatus 101 (when the image pickup apparatus 101 has detected a moving subject, perform driving in only the panning direction) and the moving subject determination method, and hence the same features will not be described.

Figure 17:
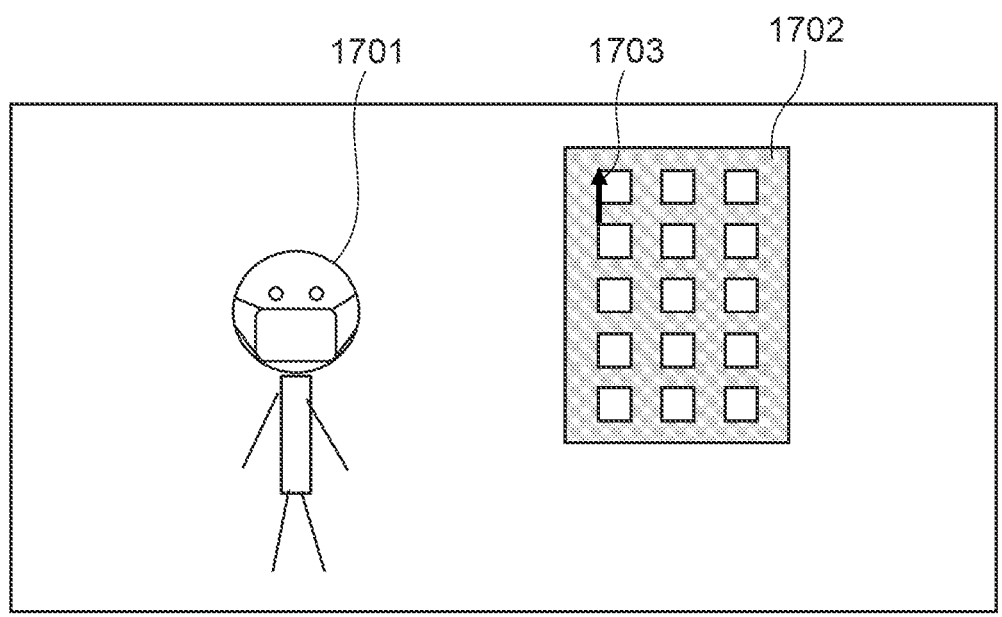
FIG. 17 is a view useful in explaining false detection of a vector.

Referring to FIG. 17, a description will now be given of a problem related to false detection of a vector. In FIG. 17, reference numeral 1701 designates a subject whose hidden face cannot be detected. Reference numeral 1702 designates a static building. A description will now be given of a problem arising in a case where a motion vector in area, in a shot image of such scene, including a part in a physically distinctive shape is detected by a technique using pattern matching.

A description will now be given of pattern matching. A rectangular area having a predetermined size in an image in the first one frame of two frames out of shot images is regarded as a template block. Then, with respect to positions in the second frame, the correlation with the distribution of pixel values in the template block is found. A position at which the correlation is the highest is a destination to which the template block moves, and the direction and amount of movement from the position of the template block in the first frame to the destination is determined to be a motion vector. Here, in a case where a repeated texture like windows of the building 1702 in FIG. 17 included in the shot images, a problem will arise that a false motion vector is detected as indicated by reference numeral 1703 due to an erroneous determination in template matching.

Figure 18:
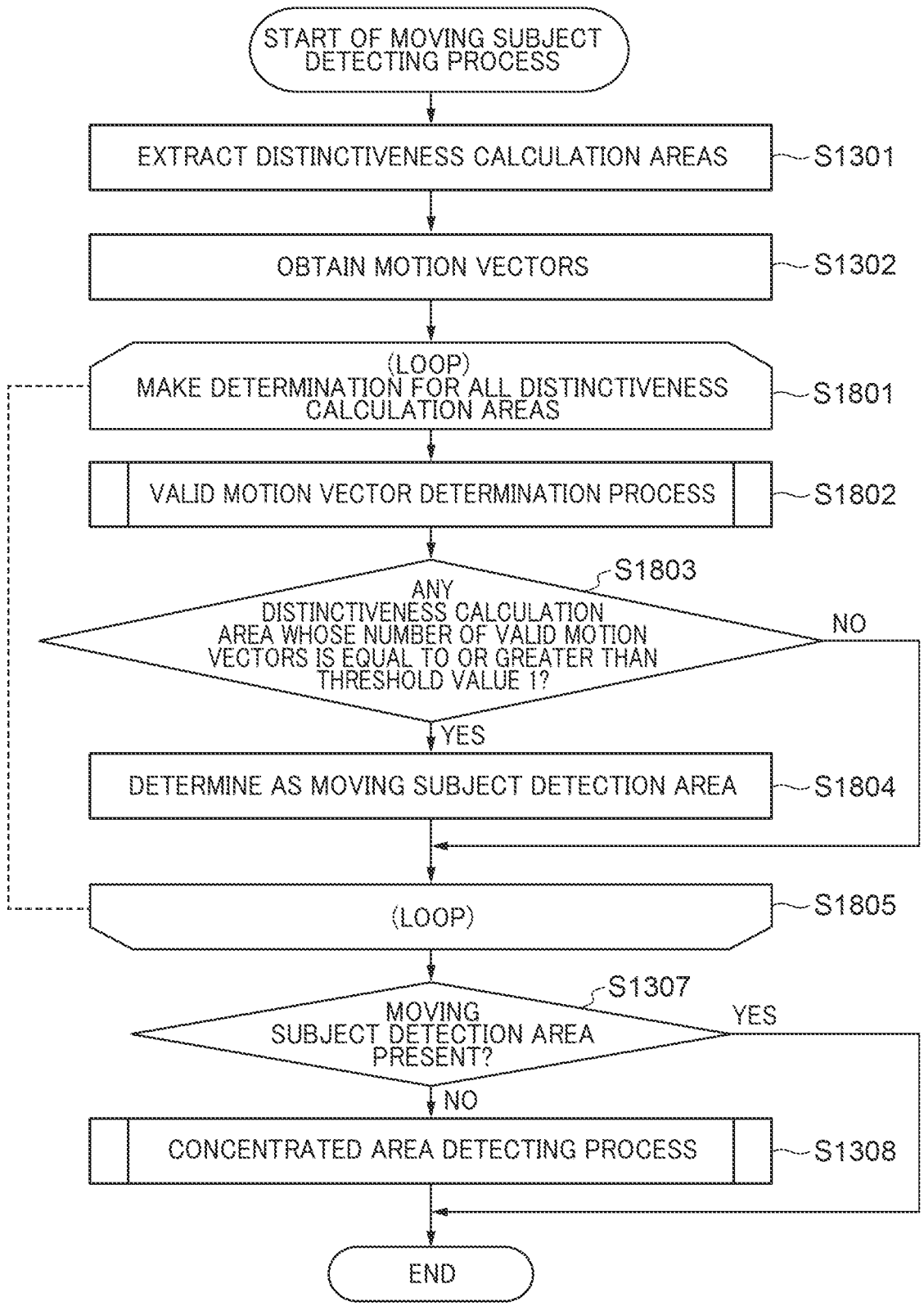
FIG. 18 is a flowchart showing a moving subject detecting process according to the fifth embodiment.

FIG. 18 is a flowchart showing a moving subject detecting process according to the fifth embodiment. Note that the process in FIG. 18 is the same as the process in the flowchart of FIG. 13 according to the fourth embodiment except that the processes in S1303 to S1306 in FIG. 13 are replaced with processes in S1801 to S1805. Namely, the processes in S1301, S1302, S1307, and S1308 are the same as those in FIG. 13. The same processes will not be described.

In loop processing in S1801 to S1805, the determination is made for all the distinctiveness calculation areas extracted in S1301 (S1801). Namely, in S1803, as a result of a valid motion vector determination process in S1802, it is determined whether or not there is any distinctiveness calculation area in which the number of motion vectors determined to be valid motion vectors is equal to or greater than a threshold value 1. Note that the process in S1802 will be described later with reference to FIG. 19. In a case where it is determined in S1803 that there is a distinctiveness calculation area in which the number of valid motion vectors is equal to or greater than the threshold value 1 (YES), the process proceeds to S1804. Then, in S1804, this distinctiveness calculation area is determined to be a moving subject detection area. On the other hand, in a case where it is determined in S1803 that there is no distinctiveness calculation area in which the number of valid motion vectors is equal to or greater than the threshold value 1 (NO), the process proceeds to S1805 to continue the loop processing.

Figure 19:
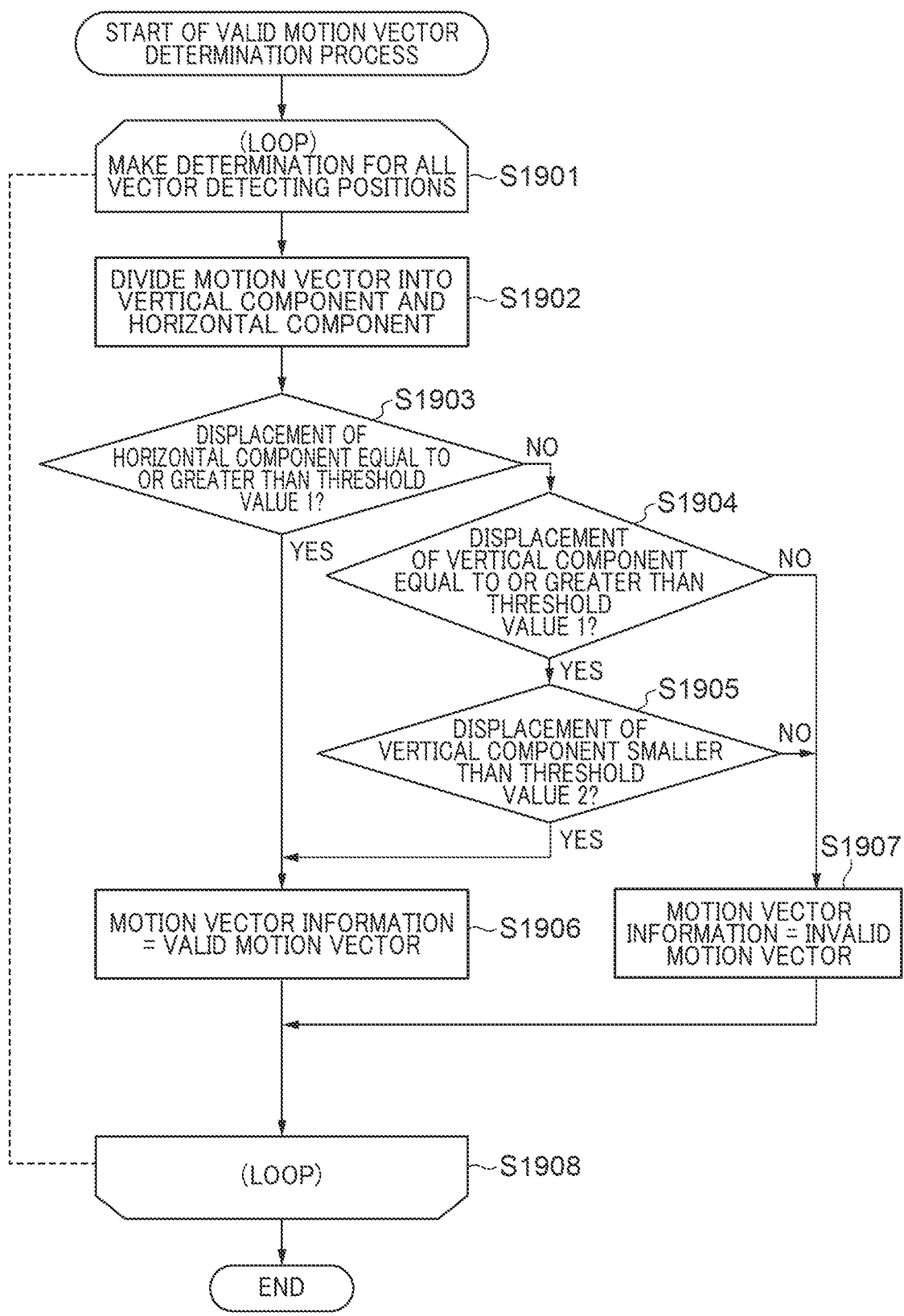
FIG. 19 is a flowchart showing a valid motion vector determination process according to the fifth embodiment.

Referring to a flowchart of a valid motion vector determination process in FIG. 19, a description will now be given of the process in S1802. In loop processing in S1901 to S1908, the following determination is made for all the motion vector detecting positions that cover the entire frame. First, in S1902, a motion vector is divided into a vertical component and a horizontal component. Next, in S1903, it is determined whether or not the displacement (moving amount) of the horizontal component is equal to or greater than a threshold value 1. In a case where the displacement of the horizontal component is equal to or greater than the threshold value 1 (YES in S1903), motion vector information is determined to be a valid motion vector (S1906), and the process proceeds to S1908 to continue the loop processing. On the other hand, in a case where it is determined in S1903 that the displacement of the horizontal component is smaller than the threshold value 1 (NO), the process proceeds to S1904, in which it is determined whether or not the displacement of the vertical component is equal to or greater than a threshold value 1.

In a case where it is determined that the displacement of the vertical component is smaller than the threshold value 1 (No in S1904), motion vector information is determined to be an invalid motion vector (S1907), and the process proceeds to S1908 to continue the loop processing. On the other hand, in a case where it is determined that the displacement of the vertical component is equal to or greater than the threshold value 1 (YES in S1904), the process proceeds to S1905, in which it is determined whether or not the displacement of the vertical component is smaller than a threshold value 2. In a case where it is determined that the displacement of the vertical component is smaller than the threshold value 2 (YES in S1905), motion vector information is determined to be a valid motion vector (S1906), and the process proceeds to S1908 to continue the loop processing. On the other hand, in a case where it is determined that the displacement of the vertical component is equal to or greater than the threshold value 2 (NO in S1905), motion vector information is determined to be an invalid motion vector (S1907), and the process proceeds to S1908 to continue the loop processing. Note that the threshold value 2 is a greater value than the threshold value 2. Namely, in a case where the magnitude of the vertical component of a motion vector is equal to or greater than the threshold value 1 and smaller than the threshold value 2, the motion vector is determined to be a valid motion vector.

As described above, according to the present embodiment, in a case where the vertical component of a motion vector is detected as a motion vector with a magnitude equal to or greater than a predetermined value due to vector false detection, the motion vector is processed as an invalid motion vector. As a result, a subject to be shot can be accurately detected while false detection of a moving object area is prevented. Note that the image pickup apparatus 101 according to the present embodiment is configured to track the motion of a detected moving subject in only the panning direction. Accordingly, in the present embodiment, the process is performed, in which the motion of the in the tilting direction, which is not motion of a target to be tracked, is regarded as an erroneously detected motion and removed. The present invention, however, is not limited to this.

Sixth Embodiment

In the sixth embodiment, a valid motion vector determination process different from the valid motion vector determination process according to the fifth embodiment described above is carried out. Note that the sixth embodiment is the same as the fifth embodiment except for the valid motion vector determination process, and hence the same features will not be described.

Figure 20:
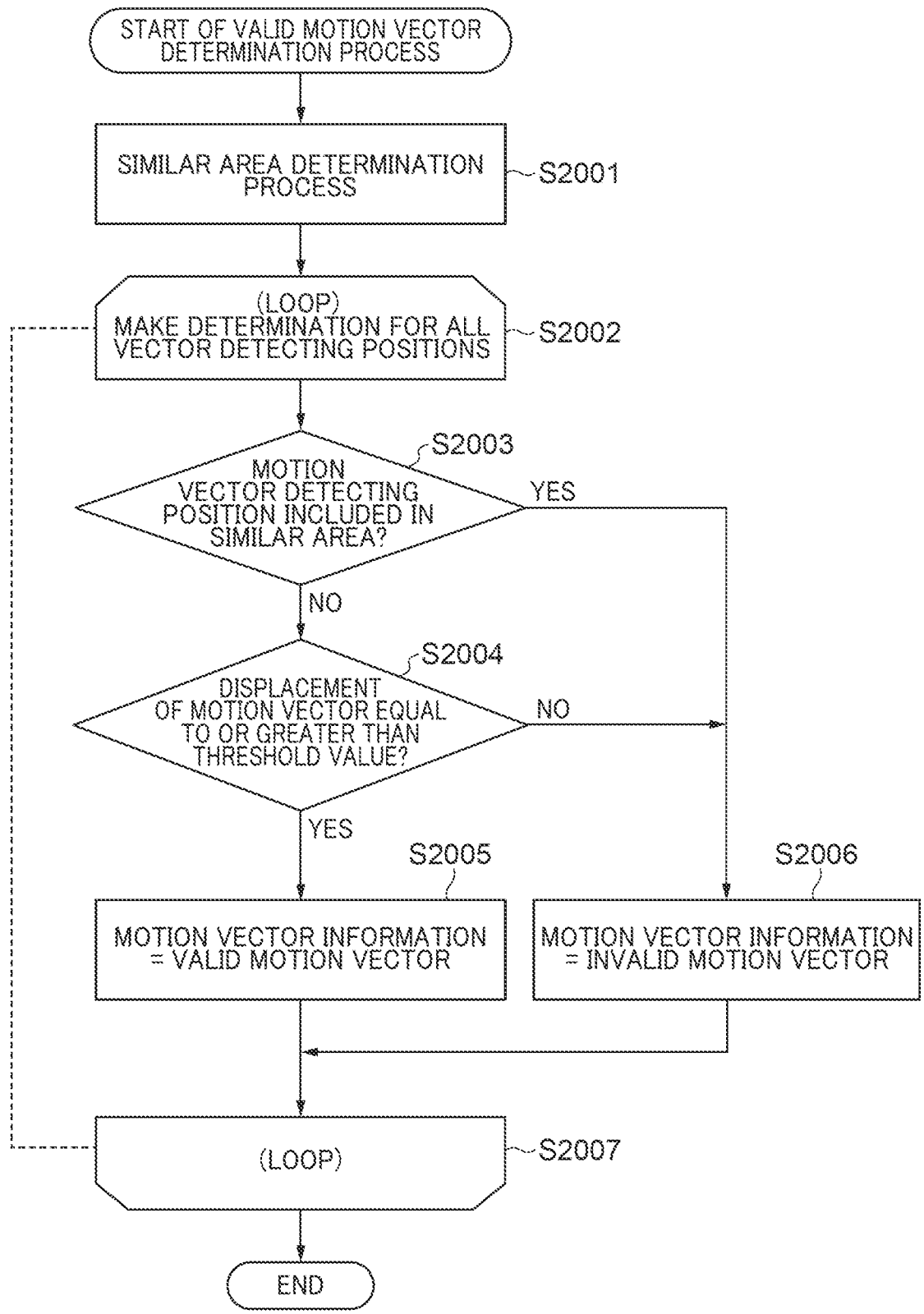
FIG. 20 is a flowchart showing a valid motion vector determination process according to the sixth embodiment.

FIG. 20 is a flowchart useful in explaining the valid motion vector determination process according to the sixth embodiment. First, a similar area determination process is carried out to determine similar area in an image using a determination unit that determines a similar area with the same pattern or the like (S2001). It is determined, using the determination unit, whether or not there is any feature value in the image, similar to a feature value of a pattern area which is a partial area extracted from the image. As a result, in a case where there is an area determined to be a similar area, area information on the pattern area is recorded. Next, in loop processing in S2002 to S2007, the following process is carried out for all motion vector detecting positions that cover the entire frame. Namely, whether a motion vector is valid or invalid is determined for all vector detecting positions.

First, in S2003 it is determined whether or not a motion vector detecting position is included in the area determined to be the similar area in the similar area determination process (S2001). In a case where it is determined that the motion vector detecting position is included in the area determined to be the similar area (YES in S2003), motion vector information is determined to be an invalid motion vector (S2006), and the process proceeds to S2007 to continue the loop processing. On the other hand, in a case where it is determined that the motion vector detecting position is not included in the area determined to be the similar area (NO in S2003), the process proceeds to S2004, in which it is determined whether or not the moving amount (displacement) of the motion vector is equal to or greater than a threshold value. In a case where it is determined that the displacement of the motion vector is equal to or greater than the threshold value (YES in S2004), motion vector information is determined to be a valid motion vector (S2005), and the process proceeds to S2007 to continue the loop processing. In a case where it is determined that the displacement of the motion vector is smaller than the threshold value (NO in S2004), motion vector information is determined to be an invalid motion vector (S2005), and the process proceeds to S2007 to continue the loop processing.

Note that in the present embodiment, an example is described that in a case where a motion vector detecting position is included in an area determined to be a similar area, motion vector information is determined to be an invalid motion vector. The present invention, however, is not limited to this. For example, in a case where a motion vector detecting position is included in an area determined to be a similar area, the valid motion vector determination process according to the fifth embodiment described above with reference to FIG. 19 may be performed. In a case where a motion vector detecting position is not included in the area determined to be the similar area, a motion vector may be determined to be a valid motion vector when the moving amount of the motion vector is equal to or greater than a threshold value.

<Summary>

The embodiments described above provide the configurations below. The image pickup apparatus 101 of the present application has the pan-tilt rotation unit (104, 105) that pans and tilts the image pickup unit 206, which outputs an image of a subject formed by the image pickup optical system, the pan-tilt drive unit 205 that drivingly controls the pan-tilt rotation unit, and the zoom drive unit 202 that changes the focal length of the image pickup optical system. The image pickup apparatus 101 also has the subject detecting unit (the image processing unit 207) that detects a specific subject in an image, and the motion vector detecting unit (the image processing unit 207) that detects motion vectors in an image. The image pickup apparatus 101 also has the moving subject detecting unit (image processing unit 207) that detects a moving subject in an image based on the detected motion vector.

The control unit 223 determines a specific subject or a moving subject as a subject (target) to be shot. Based on information on the subject to be shot, at least one of the pan-tilt drive unit 205 and the zoom drive unit 202 is drivingly controlled to adjust composition (via the image processing unit 207) immediately before shooting and control tracking of the subject to be shot while shooting.

Motion information on the subject to be shot is information indicating whether or not the subject to be shot is moving in a fixed direction. In a case where the subject to be shot is moving in the fixed direction, the pan-tilt drive unit 205 drivingly controls the pan-tilt rotation unit (104, 105) so that the angle of view in the direction in which the subject to be shot is moving can be wide (for example, S806).

Motion information on the subject to be shot is also information indicating whether or not the subject to be shot is moving regularly. In a case where the subject to be shot is not moving regularly, the control unit 223 sets a target tracking position for the subject to be shot at a position vicinity of the center of a frame. Then, the pan-tilt drive unit 205 may drivingly control the pan-tilt rotation unit (104, 105) to position the subject to be shot at the target tracking position (for example, S807).

Motion information on the subject to be shot is also information indicating the magnitude of the motion of the subject to be shot. In a case where the magnitude of the motion of the subject to be shot is equal to or greater than a predetermined value, the control unit 223 may drivingly control the zoom drive unit 202 so that the subject to be shot can be small (for example, S806).

Motion information on the subject to be shot is also information indicating the magnitude of the motion of the subject to be shot. In a case where the magnitude of the motion of the subject to be shot is smaller than a predetermined value, and the subject to be shot is a face, the pan-tilt drive unit 205 may drivingly control the pan-tilt rotation unit (104, 105) based on information on at least one of the size and orientation of the face (for example, S812). In this case, the zoom drive unit 202 may be drivingly controlled at the same time.

Motion information on the subject to be shot is information indicating whether or not the subject to be shot is moving in a fixed direction, and in a case where the subject to be shot is moving in the fixed direction, the control unit 223 obtains a tracking amount for the subject to be shot during shooting based on the motion information on the subject to be shot until immediately before shooting. Then, based on the obtained tracking amount, the pan-tilt drive unit 205 may drivingly control the pan-tilt rotation unit (104, 105) during shooting. Motion information on the subject to be shot is also information indicating whether or not the subject to be shot is moving regularly, and in a case where the subject to be shot is not moving regularly, the control unit 223 may not control tracking during shooting (for example, S815).

Motion information on the subject to be shot is information indicating whether or not the subject to be shot is moving in a fixed direction, and in a case where the subject to be shot is moving in the fixed direction, the control unit 223 obtains a tracking amount for the subject to be shot during shooting based on the motion information on the subject to be shot until immediately before shooting. Then, based on the obtained tracking amount, the pan-tilt drive unit 205 may drivingly control the pan-tilt rotation unit (104, 105) during shooting. The operating unit for issuing a shooting instruction is also provided. After a shooting instruction is issued by the operating unit being operated, the image processing unit 207 adjusts composition before shooting is started. Then, during shooting, the pan-tilt drive unit 205 may drivingly control the pan-tilt rotation unit (104, 105) based on the tracking amount for tracking control determined before shooting is started.

Further, the automatic shooting unit is provided, that automatically starts shooting based on at least two of the following: information indicating detection of a specific subject, information indicating the detection of a moving subject, information on the motion of a subject to be shot, and information on previous shooting. After the automatic shooting unit starts shooting, the image processing unit 207 adjusts composition. The tracking amount for tracking control determined by the control unit 223 before shooting is obtained. Based on the obtained tracking amount, the pan-tilt drive unit 205 may drivingly control the pan-tilt rotation unit (104, 105) during shooting.

Moreover, as shown in FIG. 13 to FIG. 16, the variety of configurations described below can be provided. The moving subject detecting unit determines the degree of distinctiveness based on information at least one of the following: hue, chroma, and brightness in an image. Then, a moving subject can be detected by determining whether or not there is any motion vector detected by the motion vector detecting unit in an area in an image where the determined distinctiveness is equal to or greater than a predetermined value. Moreover, the moving subject detecting unit may perform a detection of a moving subject, using a method different from the method using the degree of distinctiveness, that is, perform the detection of a moving subject by detecting an area where motion vectors are concentrated. Here, the area where motion vectors are concentrated means a moving subject detection area (predetermined area) where, for example, there are a predetermined number or more of valid motion vectors. The moving subject detecting unit can detect a moving subject using only motion vectors when no motion vector is detected in an area of which the distinctiveness is equal to or greater than a predetermined value.

The moving subject detecting unit may hold information on positions at which moving subject were previously detected as previous moving subject detecting position information and detect a present moving subject using positional information on the present moving subject detecting position and the previous moving subject detecting position information. The moving subject detecting unit may also detect a present moving subject using information indicating a detection of a subject performed using the moving subject detecting unit (subject detection information). The moving subject detecting unit also holds information indicating the detection of a subject performed using the moving subject detecting unit in the past (subject detection information) as previous subject detection positional information. Then, a present moving subject can be detected using positional information on the present moving subject and the previous subject detection positional information.

According to the fifth and sixth embodiments described above with reference to FIG. 17 to FIG. 20, the configurations described below are provided. First, based on the correlation in partial areas in a plurality of shot image frames, a partial area in a present image frame, corresponding to a partial area to be tracked in a previous image frame, is detected to track a subject. The moving subject detecting unit does not use a motion vector in the direction perpendicular to the tracking control direction when detecting a moving subject. In this case, the moving subject detecting unit may not use a motion vector in the vertical direction perpendicular to the tracking control direction when detecting a moving subject in a case where the tracking control direction is only the horizontal direction.

Moreover, in a case where a partial area in a shot image frame and an area whose degree of similarity with the partial area is equal to or greater than a predetermined value are included in the same image frame, the moving subject detecting unit may detect a moving subject by using motion vectors in areas other than the above area. Further, in a case where the partial area in the shot image frame and the area whose degree of similarity with the partial area is equal to or greater than a predetermined value are included in the same image frame, the moving subject detecting unit does not use motion vectors in the direction perpendicular to the tracking control direction in the said partial area in detecting a moving subject, and uses all motion vectors in the other areas in detecting a moving subject. In this case, when the tracking control direction is only the horizontal direction, and the partial area in the shot image frame and the area whose degree of similarity with the partial area is equal to or greater than the predetermined value are included in the same image frame, the moving subject detecting unit does not use motion vectors in the vertical direction perpendicular to the tracking control direction in the said partial area in detecting a moving subject, and uses all motion vectors in the other areas in detecting a moving subject.

Although the present invention has been described by way of the preferred embodiments, the present invention should not be limited to the embodiments described above, but various modifications and alterations can be made without departing from the spirit of the present invention. Although in the embodiments described above, a moving subject is detected based on a shot image, the present invention may be applied to cases where an arrangement in which motions around the image pickup apparatus 101 are detected using infrared rays, ultrasound, visible light, etc. is used.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-026897, filed Feb. 24, 2022, Japanese Patent Application No. 2022-035497, filed Mar. 8, 2022 and Japanese Patent Application No. 2022-102881, filed Jun. 27, 2022, which are hereby incorporated by reference herein in their entirety.

What is claimed is:

1. A tracking control apparatus comprising:
   at least one memory that stores a set of instructions; and
   one or more controllers configured to function as a plurality of units comprising:
   (1) a subject detecting unit configured to detect a specific subject in an image of a subject, wherein the image is formed by an image pickup optical system and captured by an image pickup portion;
   (2) a motion vector detecting unit configured to detect motion vectors in the image;
   (3) a moving subject detecting unit configured to, based on the detected motion vectors, detect a moving subject in the image; and
   (4) a control unit configured to control a drive portion which rotates the image pickup portion for tracking control,
   wherein the specific subject or the moving subject is determined as a subject to be shot which is a target of shooting,
   wherein based on motion information on the subject to be shot, the control unit controls the drive portion to adjust composition for the image pickup portion and control tracking of the subject to be shot, and
   wherein the moving subject detecting unit does not use motion vectors in a direction perpendicular to a tracking control direction for the image pickup portion when the moving subject detection unit detects a moving subject.

2. The tracking control apparatus according to claim 1, further comprising a zoom drive portion configured to change a focal length of the image pickup optical system.

3. The tracking control apparatus according to claim 1, wherein the drive portion drives the image pickup portion to rotate in a panning direction.

4. The tracking control apparatus according to claim 1, wherein the drive portion drives the image pickup portion to rotate in a tilting direction.

5. The tracking control apparatus according to claim 1, wherein the motion information on the subject to be shot is information indicating whether or not the subject to be shot is moving in a fixed direction, and
   wherein in a case where the subject to be shot is moving in a fixed direction, the drive portion is controlled so that an angle of view in a direction in which the subject to be shot is moving can be wide.

6. The tracking control apparatus according to claim 5, wherein in a case where the subject to be shot is moving in a fixed direction, a tracking amount for the subject to be shot during shooting is obtained based on the motion vectors, and wherein the drive portion is controlled based on the obtained tracking amount.

7. The tracking control apparatus according to claim 1, wherein the motion information on the subject to be shot is information indicating whether or not the subject to be shot is moving regularly, and
wherein in a case where the subject to be shot is not moving regularly, a target tracking position for the subject to be shot is set around a center of a frame, and the drive portion is controlled to position the subject to be shot at the target tracking position.

8. The tracking control apparatus according to claim 2, wherein the motion information on the subject to be shot is information indicating a magnitude of motion of the subject to be shot, and
wherein in a case where the magnitude of motion of the subject to be shot is equal to or greater than a predetermined value, the drive portion is controlled to make the subject to be shot small within a frame.

9. The tracking control apparatus according to claim 2, wherein in a case where the subject to be shot is a face, the drive portion is controlled and the zoom drive portion is controlled based on at least one of a size of the face and an orientation of the face.

10. The tracking control apparatus according to claim 1, wherein the motion information on the subject to be shot is information indicating whether or not the subject to be shot is moving regularly, and
wherein in a case where the subject to be shot is not moving regularly, tracking control is not performed.

11. The tracking control apparatus according to claim 1, further comprising an operating portion configured to issue a shooting instruction by being operated,
wherein after the operating portion is operated and issues the shooting instruction, composition is adjusted before shooting is started, and during shooting, the drive portion is controlled based on the tracking amount for the tracking control determined before the shooting is started.

12. The tracking control apparatus according to claim 2, wherein in a case where a state in which the subject to be shot cannot be determined has continued for a predetermined period of time, the drive portion is controlled so that a driving amount is a specific amount and the zoom drive portion is controlled so that the focal length is equal to a specific length.

13. The tracking control apparatus according to claim 1, further comprising a setting portion configured to be operated to set information indicating a degree of ease in detecting the moving subject,
wherein based on the motion vectors and the information set via the setting portion, the moving subject detecting unit detects the moving subject in the image.

14. The tracking control apparatus according to claim 1, wherein the moving subject detecting unit determines a degree of distinctiveness based on information at least one of hue, chroma, and brightness in the image, and detects the moving subject by determining whether or not the motion vectors detected by the motion vector detecting unit present in an area where the determined degree of distinctiveness is equal to or greater than a predetermined value.

15. The tracking control apparatus according to claim 14, wherein the moving subject detecting unit detects the moving subject by detecting an area where the motion vectors are concentrated and detects the moving subject using a method different from a method using the degree of distinctiveness.

16. The tracking control apparatus according to claim 15, wherein the moving subject detecting unit detects the moving subject using only the motion vectors when no motion vector is detected in the area where the degree of distinctiveness is equal to or greater than the predetermined value.

17. The tracking control apparatus according to claim 14, wherein the moving subject detecting unit holds previous moving subject detecting information, which is information indicating positions at which moving subjects were previously detected, and detects a present moving subject using positional information on the present moving subject and the previous moving subject detecting information.

18. The tracking control apparatus according to claim 14, wherein the moving subject detecting unit detects a present moving subject using subject detecting information indicating subject detection by the subject detecting unit.

19. The tracking control apparatus according to claim 14, wherein the moving subject detecting unit holds previous subject detection positional information, which is information indicating detection of subjects performed previously by the subject detecting unit, and detects a present moving subject using positional information on the present moving subject and the previous subject detection positional information.

20. A control method for a tracking control apparatus, the control method comprising:
detecting a specific subject in an image of a subject, wherein the image is formed by an image pickup optical system and captured by an image pickup portion;
detecting motion vectors in the image;
based on the detected motion vectors, detecting a moving subject in the image;
determining the specific subject or the moving subject as a subject to be shot which is a target of shooting; and
based on motion information on the subject to be shot, controlling a drive portion, which rotates the image pickup portion for tracking control, to adjust composition for the image pickup portion and controlling tracking of the subject to be shot,
wherein motion vectors in a direction perpendicular to a tracking control direction for the image pickup portion are not used for the detecting the moving subject.

21. A non-transitory storage medium storing a computer-executable program for executing a control method for a tracking control apparatus, the control method comprising:
detecting a specific subject in an image of a subject, wherein the image is formed by an image pickup optical system and captured by an image pickup portion;
detecting motion vectors in the image;
based on the detected motion vectors, detecting a moving subject in the image;
determining the specific subject or the moving subject as a subject to be shot which is a target of shooting; and
based on motion information on the subject to be shot, controlling a drive portion, which rotates the image pickup portion for tracking control, to adjust composition for the image pickup portion and control tracking of the subject to be shot,
wherein motion vectors in a direction perpendicular to a tracking control direction for the image pickup portion are not used for the detecting the moving subject.

22. The tracking control apparatus according to claim 1, wherein a subject is tracked by a partial area in a present image frame which corresponds to a partial area to be tracked in a previous image frame being detected based on a degree of correlation between partial areas in a plurality of shot image frames.

23. The tracking control apparatus according to claim 22, wherein in a case where the tracking control direction is only a horizontal direction, the moving subject detecting unit detects a moving subject without using motion vectors in a vertical direction perpendicular to the tracking control direction.

24. The tracking control apparatus according to claim 1, wherein in a case where a partial area in an image frame that has been shot and an area whose degree of similarity with the partial area is equal to or greater than a predetermined value are included in the same image frame, the moving subject detecting unit detects a moving subject by using motion vectors in areas other than the area.

25. The tracking control apparatus according to claim 1, wherein in a case where a partial area in an image frame that has been shot and an area whose degree of similarity with the partial area is equal to or greater than a predetermined value are included in the same image frame, the moving subject detecting unit does not use motion vectors in a direction perpendicular to a tracking control direction for the partial area when detecting a moving subject and uses all motion vectors for the other areas when detecting a moving subject.

26. The tracking control apparatus according to claim 25, wherein in a case where the tracking control direction is only a horizontal direction, and a partial area in an image frame that has been shot and an area whose degree of similarity with the partial area is equal to or greater than a predetermined value are included in the same image frame, the moving subject detecting unit does not use motion vectors in a vertical direction perpendicular to the tracking control direction for the partial area when detecting a moving subject and uses all motion vectors for the other areas when detecting a moving subject.

27. The tracking control apparatus according to claim 1, further comprising:
the image pickup portion, which is configured to output the image of the subject formed by the image pickup optical system; and
the drive portion, which is configured to rotate the image pickup portion about an axis.

28. A tracking control apparatus comprising:
at least one memory that stores a set of instructions; and
one or more controllers configured to function as a plurality of units comprising:
(1) a subject detecting unit configured to detect a specific subject in an image of a subject, wherein the image is formed by an image pickup optical system and captured by an image pickup portion;
(2) a motion vector detecting unit configured to detect motion vectors in the image;
(3) a moving subject detecting unit configured to, based on the detected motion vectors, detect a moving subject in the image; and
(4) a control unit configured to control a drive portion which rotates the image pickup portion for tracking control,
wherein the specific subject or the moving subject is determined as a subject to be shot which is a target of shooting,
wherein based on motion information on the subject to be shot, the control unit controls the drive portion to adjust composition for the image pickup portion and control tracking of the subject to be shot,
wherein the motion information on the subject to be shot is information indicating whether or not the subject to be shot is moving regularly, and
wherein in a case where the subject to be shot is not moving regularly, a target tracking position for the subject to be shot is set around a center of a frame, and the control unit controls the drive portion to position the subject to be shot at the target tracking position.

29. A control method for a tracking control apparatus, the control method comprising:
detecting a specific subject in an image of a subject, wherein the image is formed by an image pickup optical system and captured by an image pickup portion;
detecting motion vectors in the image;
based on the detected motion vectors, detecting a moving subject in the image;
determining the specific subject or the moving subject as a subject to be shot which is a target of shooting; and
based on motion information on the subject to be shot, controlling a drive portion, which rotates the image pickup portion for tracking control, to adjust composition for the image pickup portion and control tracking of the subject to be shot,
wherein the motion information on the subject to be shot is information indicating whether or not the subject to be shot is moving regularly, and
wherein in a case where the subject to be shot is not moving regularly, a target tracking position for the subject to be shot is set around a center of a frame, and the drive portion is controlled to position the subject to be shot at the target tracking position.

30. A tracking control apparatus comprising:
at least one memory that stores a set of instructions; and
one or more controllers configured to function as a plurality of units comprising:
(1) a subject detecting unit configured to detect a specific subject in an image of a subject, wherein the image is formed by an image pickup optical system and captured by an image pickup portion;
(2) a motion vector detecting unit configured to detect motion vectors in the image;
(3) a moving subject detecting unit configured to, based on the detected motion vectors, detect a moving subject in the image; and
(4) a control unit configured to control a drive portion which rotates the image pickup portion for tracking control,
wherein the specific subject or the moving subject is determined as a subject to be shot which is a target of shooting,
wherein based on motion information on the subject to be shot, the control unit controls the drive portion to adjust composition for the image pickup portion and control tracking of the subject to be shot,
wherein the motion information on the subject to be shot is information indicating whether or not the subject to be shot is moving regularly, and
wherein in a case where the subject to be shot is not moving regularly, tracking of the subject to be shot is not controlled.

31. A control method for a tracking control apparatus, the control method comprising:
detecting a specific subject in an image of a subject, wherein the image is formed by an image pickup optical system and captured by an image pickup portion;

detecting motion vectors in the image; and
based on the detected motion vectors, detecting a moving subject in the image;
determining the specific subject or the moving subject as a subject to be shot which is a target of shooting; and
based on motion information on the subject to be shot, controlling a drive portion, which rotates the image pickup portion for tracking control, to adjust composition for the image pickup portion and control tracking of the subject to be shot,
wherein the motion information on the subject to be shot is information indicating whether or not the subject to be shot is moving regularly, and
wherein in a case where the subject to be shot is not moving regularly, tracking of the subject to be shot is not controlled.

* * * * *